(12) United States Patent
Baj et al.

(10) Patent No.: US 10,432,519 B2
(45) Date of Patent: Oct. 1, 2019

(54) PACKET REDIRECTING ROUTER

(71) Applicant: 128 Technology, Inc., Burlington, MA (US)

(72) Inventors: Michael Baj, Somerville, MA (US); Patrick Timmons, Newton, MA (US); Robert Penfield, Concord, MA (US); Hadriel S. Kaplan, Nashua, NH (US); Abilash Menon, Boxborough, MA (US); Patrick J. MeLampy, Dunstable, MA (US)

(73) Assignee: 128 Technology, Inc., Burlington, MA (US)

( * ) Notice: Subject to any disclaimer, the term of this patent is extended or adjusted under 35 U.S.C. 154(b) by 113 days.

(21) Appl. No.: 15/607,009

(22) Filed: May 26, 2017

(65) Prior Publication Data

US 2018/0343196 A1 Nov. 29, 2018

(51) Int. Cl.
*H04L 12/721* (2013.01)
*H04L 12/725* (2013.01)

(52) U.S. Cl.
CPC ............ *H04L 45/70* (2013.01); *H04L 45/306* (2013.01)

(58) Field of Classification Search
CPC ..... H04L 12/2861; H04L 45/38; H04L 45/72; H04L 45/74; H04L 47/2483; H04L 69/161; H04L 45/00; H04W 80/10
See application file for complete search history.

(56) References Cited

U.S. PATENT DOCUMENTS

| 6,515,963 B1 | 2/2003 | Bechtolsheim et al. |
| 6,563,824 B1 | 5/2003 | Bhatia et al. |
| 6,584,071 B1 | 6/2003 | Kodialam et al. |

(Continued)

FOREIGN PATENT DOCUMENTS

| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Phirin Sam
*Assistant Examiner* — Debebe A Asefa
(74) *Attorney, Agent, or Firm* — Nutter McClennen & Fish LLP

(57) ABSTRACT

A packet routing method and apparatus for managing packets of a bi-directional session between a first node and a second node in an IP network receives a mid-stream packet at an intermediate node. The intermediate node is not part of the bi-directional session. Next, the method identifies the bi-directional session ("identified session") from which the mid-stream packet originated. The identified session includes a bi-directional path between the first node and the second node, while the bi-directional path includes a plurality of nodes for bi-directionally forwarding packets between the first node and the second node. The method then directs that one or more packets of the identified session be routed to at least one of the plurality of nodes of the identified session.

20 Claims, 14 Drawing Sheets

(56) References Cited

U.S. PATENT DOCUMENTS

| | | | |
|---|---|---|---|
| 6,721,334 | B1 | 4/2004 | Ketcham |
| 6,738,387 | B1 | 5/2004 | Lin et al. |
| 6,778,531 | B1 | 8/2004 | Kodialam et al. |
| 6,798,743 | B1 | 9/2004 | Ma et al. |
| 7,020,143 | B2 | 3/2006 | Zdan |
| 7,035,214 | B1 | 4/2006 | Seddigh et al. |
| 7,106,739 | B2 | 9/2006 | Beier |
| 7,150,037 | B2 | 12/2006 | Wolf et al. |
| 7,154,902 | B1 | 12/2006 | Sikdar |
| 7,218,632 | B1 | 5/2007 | Bechtolsheim et al. |
| 7,315,541 | B1 | 1/2008 | Housel et al. |
| 7,373,660 | B1 | 5/2008 | Guichard et al. |
| 7,466,703 | B1 | 12/2008 | Arunachalam et al. |
| 7,536,720 | B2 | 5/2009 | Burdett et al. |
| 7,634,805 | B2 | 12/2009 | Aroya |
| 7,706,411 | B2 | 4/2010 | Wakumoto et al. |
| 7,730,301 | B2 | 6/2010 | Correll et al. |
| 7,773,611 | B2 | 8/2010 | Booth, III et al. |
| 7,852,772 | B2 | 12/2010 | Filsfils et al. |
| 7,872,973 | B2 | 1/2011 | Sterne et al. |
| 8,068,417 | B1 | 11/2011 | Roberts |
| 8,094,560 | B2 | 1/2012 | Bagepalli et al. |
| 8,139,479 | B1 | 3/2012 | Raszuk |
| RE44,119 | E | 4/2013 | Wang et al. |
| 8,437,248 | B2 | 5/2013 | Li et al. |
| 8,527,641 | B2 | 9/2013 | Degaonkar et al. |
| 8,570,893 | B2 | 10/2013 | Guo et al. |
| 8,584,199 | B1 | 11/2013 | Chen et al. |
| 8,634,428 | B2 | 1/2014 | Le Pennec et al. |
| 8,804,489 | B2 | 8/2014 | Lu et al. |
| 8,942,085 | B1 | 1/2015 | Pani et al. |
| 8,989,020 | B2 | 3/2015 | So |
| 9,059,920 | B2 | 6/2015 | Ravindran et al. |
| 9,160,652 | B2 | 10/2015 | Taillon et al. |
| 9,240,953 | B2 | 1/2016 | Carlstrom |
| 9,276,864 | B1 | 3/2016 | Vincent |
| 9,729,439 | B2 * | 8/2017 | MeLampy ............... H04L 45/38 |
| 2001/0030649 | A1 | 10/2001 | Mamiya et al. |
| 2002/0044553 | A1 | 4/2002 | Chakravorty |
| 2002/0075883 | A1 | 6/2002 | Dell et al. |
| 2002/0176363 | A1 | 11/2002 | Durinovic-Johri et al. |
| 2003/0198189 | A1 | 10/2003 | Roberts et al. |
| 2003/0214938 | A1 | 11/2003 | Jindal et al. |
| 2004/0088542 | A1 | 5/2004 | Daude et al. |
| 2004/0264481 | A1 | 12/2004 | Darling et al. |
| 2005/0036616 | A1 | 2/2005 | Huang et al. |
| 2005/0063307 | A1 | 3/2005 | Samuels et al. |
| 2005/0182932 | A1 | 8/2005 | Wheeler |
| 2005/0238022 | A1 | 10/2005 | Panigrahy |
| 2006/0176894 | A1 | 8/2006 | Oh et al. |
| 2007/0171825 | A1 | 7/2007 | Roberts et al. |
| 2007/0171826 | A1 | 7/2007 | Roberts et al. |
| 2008/0214175 | A1 | 9/2008 | Papadoglou et al. |
| 2009/0007021 | A1 | 1/2009 | Hayton |
| 2009/0059958 | A1 | 3/2009 | Nakata |
| 2010/0125898 | A1 | 5/2010 | Dubuc et al. |
| 2010/0191968 | A1 | 7/2010 | Patil et al. |
| 2012/0144061 | A1 | 6/2012 | Song |
| 2012/0236860 | A1 | 9/2012 | Kompella et al. |
| 2013/0227166 | A1 | 8/2013 | Ravindran et al. |
| 2013/0297824 | A1 | 11/2013 | Lan et al. |
| 2014/0040488 | A1 | 2/2014 | Small et al. |
| 2015/0188814 | A1 | 7/2015 | Jain et al. |
| 2015/0229618 | A1 | 8/2015 | Wan et al. |
| 2015/0381324 | A1 | 12/2015 | Mirsky et al. |
| 2016/0094444 | A1 | 3/2016 | MeLampy et al. |
| 2017/0353516 | A1 * | 12/2017 | Gordon ............... H04N 21/8456 |

FOREIGN PATENT DOCUMENTS

| | | | |
|---|---|---|---|
| CN | 101068242 | B | 4/2010 |
| CN | 102158371 | A | 8/2011 |
| CN | 101640629 | B | 8/2012 |
| CN | 102739507 | A | 10/2012 |
| CN | 101207604 | B | 3/2013 |
| CN | 102769679 | B | 6/2015 |
| CN | 103179192 | B | 11/2015 |
| CN | 105245469 | A | 1/2016 |
| EP | 1 313 267 | B1 | 12/2006 |
| KR | 10-2011-0062994 | A | 6/2011 |
| WO | WO 2007/084707 | A2 | 7/2007 |
| WO | WO 2007/084755 | A2 | 7/2007 |
| WO | WO 2008/043230 | A1 | 4/2008 |
| WO | WO 2015/131537 | A1 | 9/2015 |
| WO | WO 2016/007052 | A1 | 1/2016 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

CAIDA, *Observing routing asymmetry in Internet traffic*, (www.caida.org/research/traffic-analysis/asymmetry/1), 7 pages, dated Jul. 17, 2013.

Chiosi et al., *Network Functions Virtualisation—Introductory White Paper*, Issue 1, at the "SDN and OpenFlow World Congress", Darmstadt—Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, printed Jun. 17, 2015, 4 pages.

Data Plane Development Kit, *Programmer's Guide, Release 16.04.0*, 216 pages, Apr. 12, 2016.

Davis, *Layer 3 Switches Explained*, Happy Router, 6 pages, dated Aug. 30, 2007.

Filsfils et al., *Segment Routing Architecture*, Network Working Group, Draft, 28 pages, Oct. 21, 2013.

Hansson et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., 11 pages, Oct. 26, 2010.

IANA, *Transmission Control Protocol (TCP) Parameters*, (www.iana.org/assignments/tcp-parameters/tcp-parameters.xhtm), 5 pages, dated Sep. 22, 2014.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Klement, *1.2 Overview of a TCP communications session*, RPG IV Socket Tutorial (http://www.scottklement.com/rpg/socketut/overview), 2 pages, 2001.

Microsoft, *Introduction to Receive Side Scaling*, Developer Resources, https://msdn.microsoft.com/en-us/library/windows/hardware/ff556942(v=vs.85).aspx, 3 pages, Apr. 2014.

Microsoft, *RSS with a Single Hardware Receive Queue*, Developer Resources, https://msdn.microsoft.com/en-us/library/windows/hardware/ff570727(v=vs.85).aspx, 2 pages, Jan. 2015.

Microsoft, *RSS with Hardware Queuing*, Developer Resources, https://msdn.microsoft.com/en-us/library/windows/hardware/ff570728(v=vs.85).aspx, 2 pages, Jan. 2015.

Microsoft, *Non-RSS Receive Processing*, Developer Resources, https://msdn.microsoft.com/en-us/library/windows/hardware/ff568798(v=vs.85).aspx, 2 pages, Jan. 2015.

PC Magazine Encyclopedia, *Definition of TCP/IP abc's*, PC Magazine Encyclopedia (www.pcmag.com/encyclopedia/term/52615), 5 pages, 2005.

Previdi, et al., *IPv6 Segment Routing Header (SRH)*, Network working Group, Draft, 24 pages, Jul. 3, 2014.

Roberts, *The Next Generation of IP—Flow Routing*, SSGRR 2003S International Conference, L'Aquila Italy, 11 pages, Jul. 29, 2003.

Rouse, *What is routing table?*, Posted by Margaret Rouse (http://searchnetworking.techtarget.com/definition/routing-table), 5 pages, Apr. 2007.

Shang et al., *Making Better Use of All Those TCP ACK Packets*, Computer Science Department, Worcester Polytechnic Institute, 10 pages, 2005.

(56) References Cited

OTHER PUBLICATIONS

Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.

Sollins et al., *Functional Requirements for Uniform Resource Names*, Network Working Group, Request for Comments 1737, 7 pages, Dec. 1994.

Srinivasan et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.

Wikipedia, *LAN switching*, 5 pages, dated Jun. 12, 2013.

Wikipedia, *Management information base*, 6 pages, dated Jul. 15, 2013.

Wikipedia, *Reverse path forwarding*, 3 pages, dated Jul. 31, 2013.

Wikipedia, *Equal-cost multi path routing*, 1 page, dated Sep. 12, 2013.

Wikipedia, *Transmission Control Protocol*, 18 pages, dated Sep. 16, 2013.

Wikipedia, *Software-defined networking*, 6 pages, dated Sep. 16, 2013.

Wikipedia, *Network socket*, 4 pages, dated Sep. 19, 2013.

Wikipedia, *Router (computing)*, 8 pages, dated Sep. 23, 2013.

Wikipedia, *Network address translation*, 11 pages, dated Sep. 24, 2013.

Wikipedia, *Open vSwitch*, 2 pages, dated Nov. 24, 2013.

Wikipedia, *Active queue management*, https://en.wikipedia.org/wiki/Active_queue_management, 2 pages, Apr. 22, 2015.

Wikipedia, *Network interface controller*, https://en.wikipedia.org/wiki/Network_interface_controller, 5 pages, May 19, 2015.

International Searching Authority, International Search Report—International Application No. PCT/2015/044815, dated Dec. 6, 2015, together with the Written Opinion of the International Searching Authority, 8 pages.

International Searching Authority, International Search Report—International Application No. PCT/2015/060840, dated Mar. 8, 2016, together with the Written Opinion of the International Searching Authority, 13 pages.

International Searching Authority, International Search Report—International Application No. PCT/US2016/013416, dated Jun. 8, 2016, together with the Written Opinion of the International Searching Authority, 12 pages.

International Searching Authority, International Search Report—International Application No. PCT/US2016/026938, dated Jul. 28, 2016, together with the Written Opinion of the International Searching Authority, 9 pages.

\* cited by examiner

PACKET REDIRECTING ROUTER

FIELD OF THE INVENTION

The invention generally relates to computer networks and, more particularly, the invention relates to routing packets across computer networks.

BACKGROUND OF THE INVENTION

Routers transmit data across the Internet using the Internet Protocol ("IP"). As known by those in the art, IP serves as the de-facto standard for forwarding data messages ("datagrams") between network devices connected with the Internet. To that end, IP delivers datagrams across a series of Internet devices, such as routers, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet.

Upstream network failures or routing reconfigurations can adversely impact the integrity of a session between two network devices.

SUMMARY OF VARIOUS EMBODIMENTS

In accordance with one embodiment of the invention, a router is configured to manage packets of a bi-directional session between a first node and a second node in an IP network. In this instance, however, the router is not part of the noted bi-directional session. To that end, the router has an interface for receiving a mid-stream packet at an intermediate node, and a session identifier operably coupled with the interface. The packet identifier is configured to identify the bi-directional session ("identified session") from which the mid-stream packet originated after receipt of the mid-stream packet. The identified session has a bi-directional path (between the first node and the second node) that includes a plurality of nodes for bi-directionally forwarding packets between the first node and the second node. The router also has a packet redirector operably coupled with the packet identifier. The packet redirector is configured to direct routing of one or more packets of the identified session to at least one of the plurality of nodes of the identified session.

The packet redirector may use a plurality of different ways to direct that the packet(s) are redirected to the node(s) of the identified session. For example, the packet redirector may be configured to forward the one or more packets of the identified session toward the at least one of the plurality of nodes of the identified session. Alternatively, the packet redirector is configured to forward a flow modify command to an upstream node that forwarded the packet(s) to the router. The flow modify command includes information that causes the upstream node to forward the one or more packets of the identified session toward the at least one of the plurality of nodes of the identified session Among other types, the router may function as an edge router. The session also may forward the packets using the TCP protocol. Moreover, the router may also have a packet identifier operably coupled with the interface. The packet identifier is configured to determine whether the packet is a mid-stream packet of the bi-directional session before identifying the bi-directional session. To be a mid-stream packet, the packet is neither the first nor the last packet. Specifically, the identified stream includes a first packet, a plurality of mid-stream packets, and a final packet. The mid-stream packet therefore is one of the plurality of mid-stream packets.

The router may be operably coupled with a local database having records of a plurality of bi-directional sessions. In that case, the router may be part of a local network (e.g., an autonomous system) that includes the local database. The identified session, in this example, may be one of the plurality of bi-directional sessions, where the session identifier is configured to access the local database to identify the bi-directional session.

In accordance with another embodiment, a packet routing method for managing packets of a bi-directional session between a first node and a second node in an IP network receives a mid-stream packet at an intermediate node. The intermediate node is not part of the bi-directional session. Next, the method identifies the bi-directional session ("identified session") from which the mid-stream packet originated. The identified session includes a bi-directional path between the first node and the second node, while the bi-directional path includes a plurality of nodes for bi-directionally forwarding packets between the first node and the second node. The method then directs that one or more packets of the identified session be routed to at least one of the plurality of nodes of the identified session.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a management node responds to upstream routing changes and failures in a bi-directional stateful session by directing session flows/packets back toward network nodes in the path between two end nodes. To that end, when a network node (e.g., a router acting as the management node) receives a mid-stream packet from a given session in which it does not participate, that node directs subsequent packets in that session back toward a given node in the path of that session. To that end, the network node may directly forward session subsequent packets toward the given node in the given session path, or send a command to another upstream device to forward session packets toward the given node. Details of illustrative embodiments are discussed below.

Networks

Illustrative embodiments preferably are implemented on a conventional computer network. Among other things, a network includes at least two nodes and at least one link between the nodes. Nodes can include computing devices (sometimes referred to as hosts) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
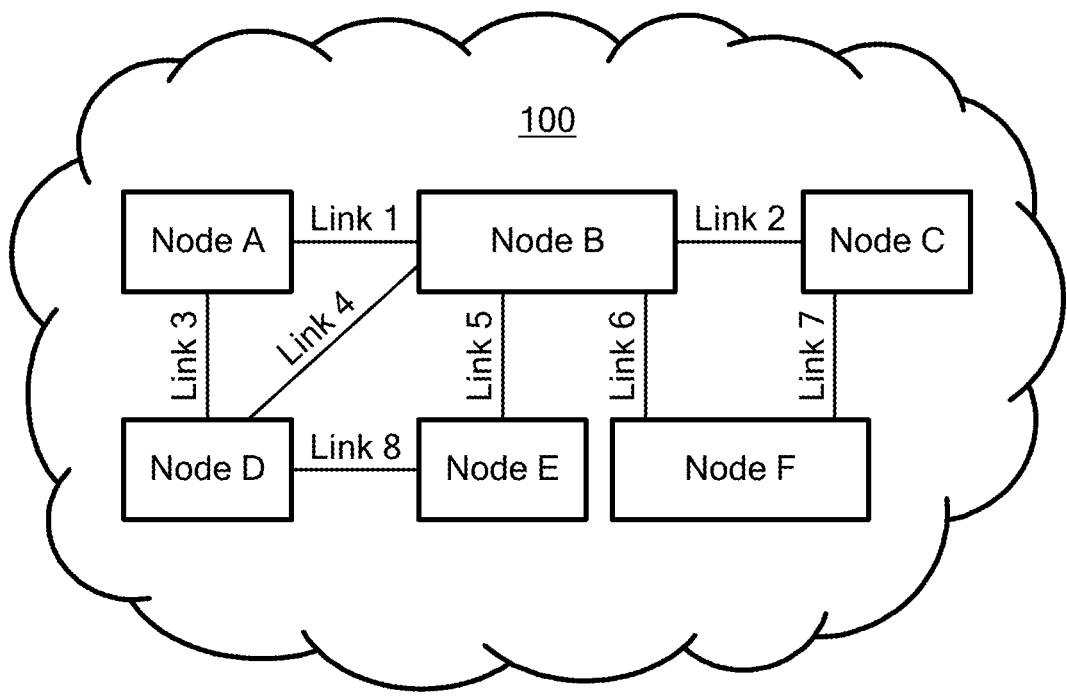
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C, . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and above noted Transmission Control Protocol (TCP). The protocols are typically implemented by layered software and/or hardware components according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
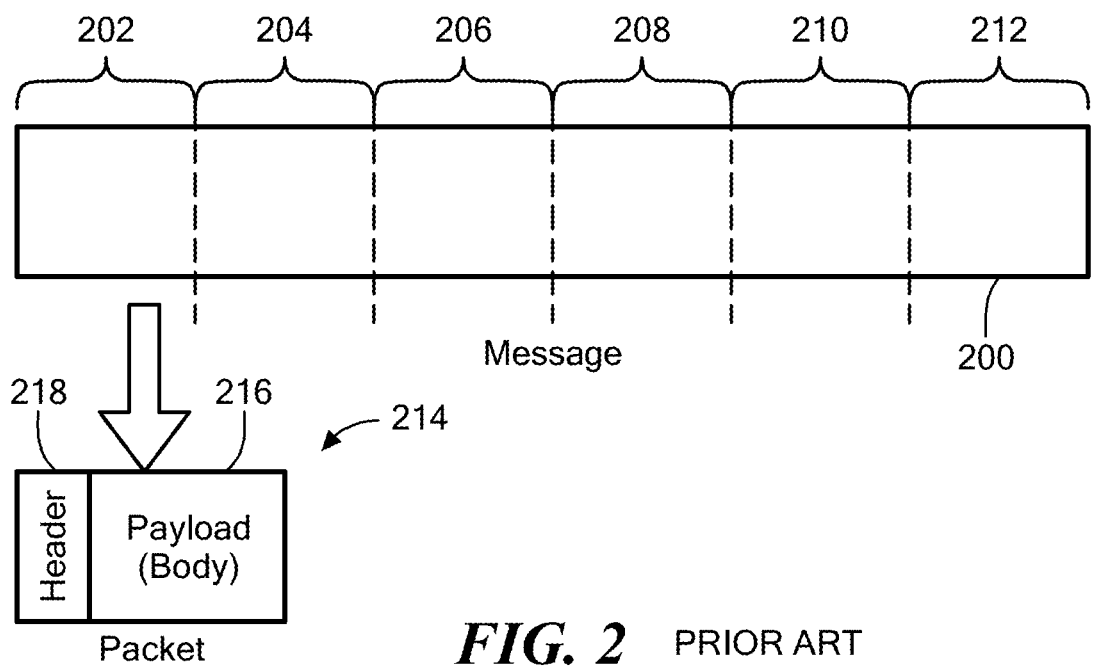
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher layer protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 is used to find gateways to get an IP packet from the source to the destination.

Figure 3:
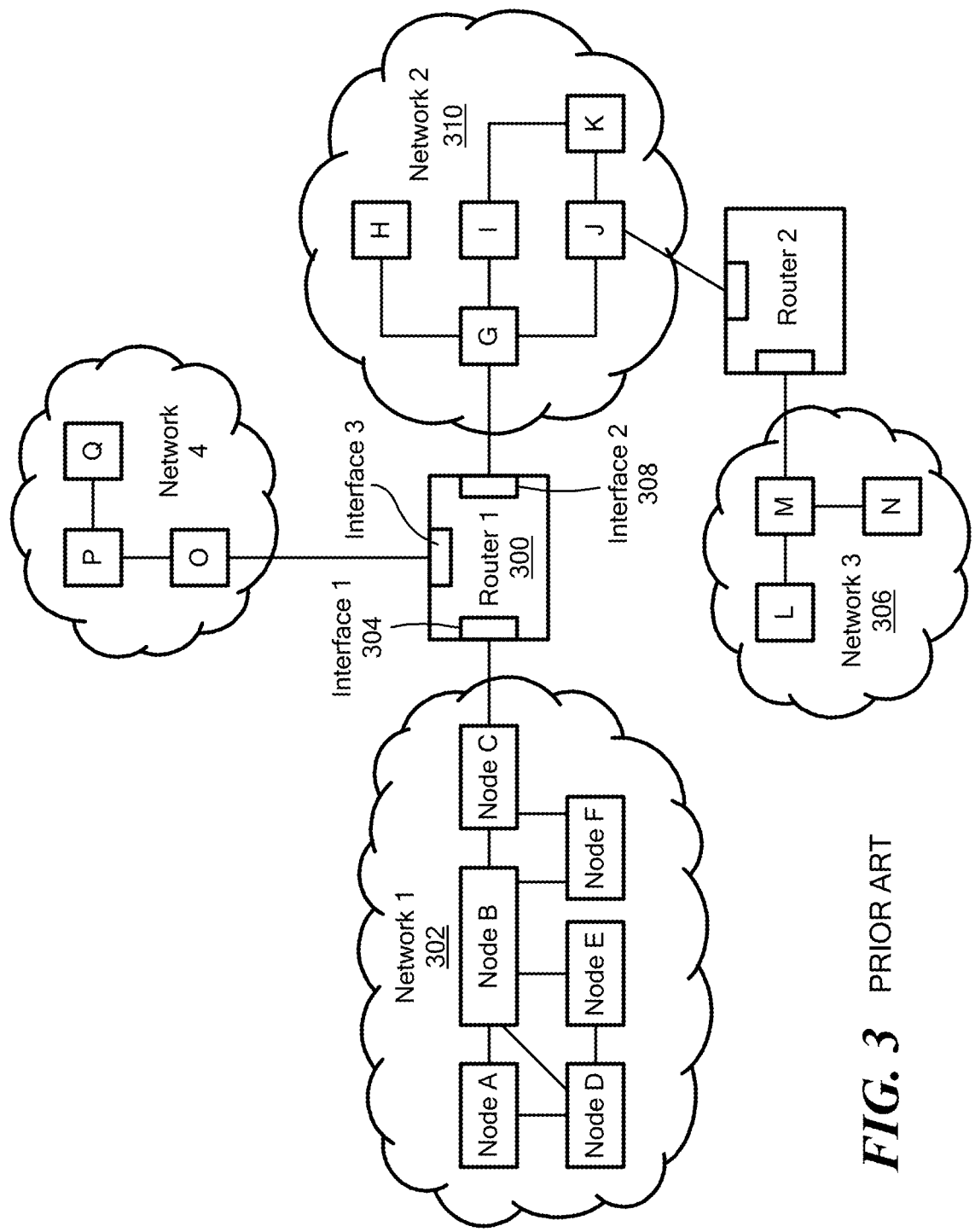
FIG. 3 schematically shows a hypothetical internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured. Illustrative embodiments discussed below relate to an improved apparatus and method for optimizing statistical data generation and collection.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |

TABLE 1-continued

| | |
|---|---|
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learns about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. The number of addresses a computer has is orthogonal to the number of services it may provide, although it has at least one. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Stateful Routing

In illustrative embodiments, the packets of a session follow the same path as the lead packet of that session, at least in the forward direction, i.e., from a source client to a destination service. The subsequent packets traverse at least a subset of the routers the lead packet traverses between the source client and the destination service. Among other benefits, this stateful routing scheme more effectively enhances the benefits of collecting routing statistics.

Each router in the subset is referred to herein as an intermediate node or waypoint, although the waypoints are not necessarily predetermined before the lead packet is sent by the source client. The lead packet may be naturally routed, or routed by a pre-specified path. It should be noted that although the discussion below describes use of natural routing, it should not limit various embodiments to such a scheme. If the path is not pre-specified, then the path taken by the lead packet establishes the waypoints. In either case, the subsequent packets traverse the same waypoints, and in the same order, as the lead packet.

Of course, some packets may be dropped along the way, as is typical in an IP network or internet, such as by an overloaded router or due to corruption of the packet by a link. Thus, all the packets sent by the source client need not reach the session's destination service and, consequently, all the packets sent by the source client need not traverse all the waypoints. However, subsequent packets that do reach the destination service traverse all the waypoints. For simplicity of explanation, dropped packets are ignored in the remaining discussion, and the term "all the packets" means all the packets that reach their respective destinations.

As a result of this forward flow control, metrics collected at one of the waypoints represent all the packets of the session. These metrics are not diluted by packets that bypass the waypoint, because no packet of the session can bypass any waypoint. Security functions, such as inspection for malicious packets, performed at one waypoint are sure to be performed on all packets of the session. Importantly, this enables statistics to be calculated for specific sessions.

Preferred embodiments also ensure that return packets from the destination service to the source client also follow the same path, i.e., traverse the waypoints, but in reverse order. This reverse flow control enables use of paths, such as via proprietary networks, that might not otherwise be available by naturally routing the return packets.

Figure 4:
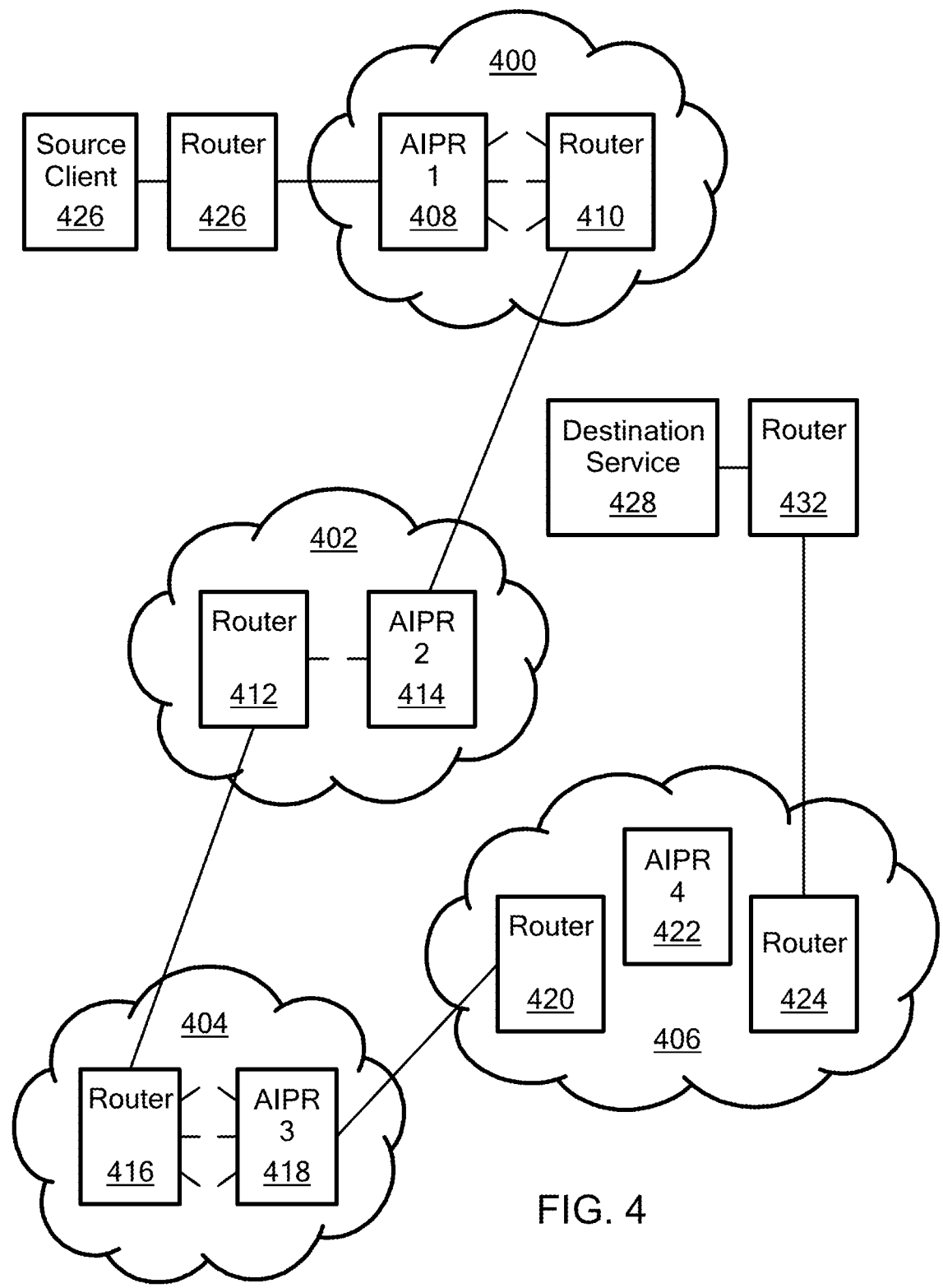
FIG. 4 schematically shows a hypothetical internet that includes a conventional routers and augmented IP routers (AIPRs), according to an embodiment of the present invention.

A packet flow controller (also referred to herein as an augmented IP router ("AIPR")) ensures that subsequent packets of a session follow the same path as the lead packet of the session, as discussed above. In fact, one or both of the routers R1 and R6 of FIG. 4 may be implemented as AIPRs/waypoints. An AIPR also performs conventional routing functions, and also those described above with regard to statistics collection. FIG. 4 is a schematic diagram illustrating a hypothetical set of interconnected networks 400, 402, 404 and 406, i.e., an internet. Each network 400-406 includes a number of routers and AIPRs, not all of which are necessarily shown. Network 400 includes AIPR 1 408 and router 410. Network 400 may be, for example, a network of a telecommunications carrier. Network 402 includes a router 412 and AIPR 2 414. Network 402 may be, for example, a network of a first ISP. Network 404 includes a router 416 and AIPR 3 418. Network 404 may be, for example, the Internet backbone or a portion thereof. Network 406 includes a router 420, AIPR 4 422 and another router 424. Network 406 may be, for example, a network of a second ISP.

Assume a source client node 426 initiates a session with a destination service node 428. For example, the source client 426 may request a web page, and the destination service node 428 may include a web server. The source client 426 may, for example, be part of a first local area network (LAN) (not shown) within a first corporation, and the LAN may be connected to the telecommunications carrier network 401 via a gateway router 430 operated by the corporation. Similarly, the destination service node 428 may be operated by a second corporation, and it may be part of a second LAN (not shown) coupled to the network 406 of the second ISP via a gateway router 432 operated by the second corporation. As a lead packet of the session traverses the internet, each AIPR (waypoint) the packet traverses records information that eventually enables the waypoint to be able to identify its immediately previous waypoint and its immediately next waypoint, with respect to the session.

As suggested above, the lead packet of the session can be naturally routed. Assume the lead packet reaches AIPR 1 408 before it reaches network 402, 404 or 406. AIPR 1 408 automatically identifies the lead packet as being an initial packet of the session. AIPR 1 408 may use various techniques to identify the beginning of a session, as noted above and as discussed in more detail below. AIPR 1 408 becomes the first waypoint along a path the lead packet eventually follows.

AIPR 1 408 assigns a unique identifier to the session and stores information about the session in the AIPR's database to enable the AIPR 1 408 to identify subsequent packets of the session. In some embodiments, AIPR 1 408 reads the client socket/service socket number pair in the lead packet and stores the client socket/service socket number pair in a database to uniquely identify the session. This enables the AIPR 1 408 to identify the subsequent packets as being part of the session, because all subsequent packets of the session will contain the same client socket/service socket number pair.

In some embodiments, AIPR 1 408 sets a flag in its database to indicate the lead packet has not traversed any other AIPR before reaching AIPR 1 408. This flag may be used later, for example when the AIPR 1 408 handles return packets. AIPR 1 408 may be able to identify the lead packet as not having traversed any other AIPR by lack of any modification to the packet. Packet modification is described below.

AIPR 1 408 modifies the lead packet to indicate the lead packet has been handled by an AIPR. In some embodiments, the AIPR 1 408 stores the unique identifier of the session and, if not included in the unique identifier, the AIPR's network address in the packet to produce a modified lead packet. Subsequent AIPRs, if any, that handle the (now modified) lead packet use this modification to identify the lead packet as a lead packet that has been handled by an AIPR, and to indicate that subsequent packets of the session should be routed the same way as the lead packet is routed.

In some embodiments, AIPR 1 408 assigns a port number on the interface over which AIPR 1 408 will forward the lead packet. The AIPR's network address and this port number, in combination, may be used as a unique identifier of the session, at least from the point of view of the next AIPR along the path. AIPR 1 408 may include the AIPR's network address-port number combination in the modified lead packet. Thus, the next AIPR along the path may assume that subsequent packets sent from this network address-port number combination are part of, or likely to be part of, the session.

AIPR 1 408 then forwards the lead packet naturally. The lead packet traverses an unspecified number of nodes of network 401 until it reaches router 410, which naturally routes the lead packet to network 402. Assume the router 410 forwards the lead packet to AIPR 2 414 in network 402.

AIPR 2 414 detects the modification to the lead packet, identifying a need for special treatment. AIPR 2 414 becomes the second waypoint along the path the lead packet will follow. AIPR 2 414 stores in its database the network address of AIPR 1 408 and the port number assigned by AIPR 1 408, in association with a unique identifier of the session, such as the client and server socket number pair, thus identifying the previous waypoint along the path in association with the session. In this way, each waypoint learns the network address and port number of the previous waypoint along this session's path and uses a related association device (an "associator") to associate this information with a session identifier. This information may be used later to forward return packets, from waypoint to waypoint, back to the source client 426—using the same nodes (i.e., waypoints) in the reverse direction.

In some embodiments, AIPR 2 414 assigns a port number on the interface over which the lead packet was received. The AIPR's network address and this port number, in combination, may be used as a unique identifier of the session, at least from the point of view of AIPR 1 408. Thus, subsequent packets addressed to this network address-port number combination may be assumed to be, or at least are likely to be, part of the session.

In some embodiments, AIPR 2 414 sends a packet back to AIPR 1 408 to inform AIPR 1 408 of the network address-port number combination, in association with the identification of the session. In some embodiments, the network address-port number combination are sent to AIPR 1 408 later, in connection with a return packet, as described below. In either case, AIPR 1 408 learns a network address-port number combination unique to the session, and AIPR 1 408 sends subsequent packets to that address-port combination, rather than naturally forwarding the subsequent packets. In this way, each waypoint learns the network address and port number of the next waypoint along this session's path. This information is used to forward subsequent packets, from waypoint to waypoint, forward to the destination service 428, along the same path as the lead packet.

AIPR 2 214 modifies the lead packet to include the network address of AIPR 2 214, and then forwards the lead packet naturally. As with AIPR 1 408, in some embodiments AIPR 2 214 assigns a port number on the interface over which AIPR 2 214 forwards the packet, and the network address of AIPR 2 214 and the port number are included in the modified lead packet AIPR 2 214 sends.

The lead packet traverses an unspecified number of nodes of network 402, until it reaches router 412, which naturally routes the lead packet to network 404. Assume the router 416 forwards the lead packet to AIPR 3 418.

AIPR 3 418 becomes the third waypoint along the path the lead packet will follow. AIPR 3 418 operates much as AIPR 2 414. The lead packet is then forwarded to network 406, where it traverses AIPR 4 422, which becomes the fourth waypoint.

Three scenarios are possible with respect to the last AIPR 422 (AIPR 4) along the path to the destination service 428.

In the first scenario, one or more AIPRs relatively close to a destination service are provisioned to handle lead packets for the destination service. The AIPRs may be so provisioned by storing information in their databases to identify the destination service, such as by the service socket number or other unique identifier of the service. These "terminus" AIPRs broadcast their ability to forward packets to the destination service. A terminus AIPR is an AIPR that can forward packets to a destination service, without the packets traversing another AIPR A terminus AIPR recognizes a lead packet destined to a service that terminates at the AIPR by comparing the destination service socket number to the information provisioned in the AIPR's database.

If AIPR 4 422 has been so provisioned, AIPR 4 422 may restore the lead packet to its original form, i.e., the form the lead packet had when the source client 426 sent the lead packet, or as the packet might have been modified by the router 430, such as a result of network address translation (NAT) performed by the router 430. Thus, the lead packet may be restored to a form that does not include any of the modifications made by the waypoints 408, 414 and 418. AIPR 4 422 then forwards the lead packet to the destination service 428. Like AIPR 3 418, AIPR 4 422 stores information in its database identifying AIPR 3 418 as the previous AIPR for this session.

In the second scenario, AIPR 4 422 is not provisioned with information about the destination service 428. In such embodiments, AIPR 4 422 may operate much as AIPR 2 414 and AIPR 3 418 operate. AIPR 4 422 modifies and naturally forwards the lead packet, and the lead packet is eventually delivered to the destination service 428. The destination service 428 responds to the lead packet. For example, if the lead packet is a SYN packet to initiate a TCP session, the destination service 428 responds with an ACK or SYN/ACK packet. AIPR 4 422 recognizes the return packet as being part of the session, such as based on the source client/destination service network address/port number pairs in the return packet. Furthermore, because the return packet was sent by the destination service 428, and not another AIPR, AIPR 4 422 recognizes that it is the last AIPR along the path for this service.

AIPR 4 422 stores information in its database indicating AIPR 4 422 is a terminus AIPR. If AIPR 4 422 receives subsequent packets of the session, AIPR 4 422 may restore the subsequent packets to their original forms, i.e., the forms the subsequent packets had when the source client 426 sent the subsequent packets, or as the packets might have been modified by the router 430, such as a result of network address translation (NAT) performed by the router 430. AIPR 4 422 forwards the subsequent packets to the destination service 428.

AIPR 4 422 modifies the return packet to include a port number on the interface AIPR 4 422 received the lead packet from AIPR 3 418, as well as the network address of AIPR 4 422. AIPR 4 422, then forwards the return packet to AIPR 3 418. Although the return packet may be forwarded by other routers, AIPR 4 422 specifically addresses the return packet to AIPR 3 418. This begins the return packet's journey back along the path the lead packet traveled, through all the waypoints traversed by the lead packet, in reverse order. Thus, the return packet is not naturally routed back to the source client 426.

AIPR 3 418 receives the modified return packet and, because the return packet was addressed to the port number AIPR 3 418 previously assigned and associated with this session, AIPR 3 418 can assume the return packet is part of, or likely part of, the session. AIPR 3 418 copies the network address and port number of AIPR 4 422 from the return packet into the AIPR's database as the next waypoint for this session. If AIPR 3 418 receives subsequent packets of the session, AIPR 3 418 forwards them to the network address and port number of the next waypoint, i.e., AIPR 4 422.

Thus, once an AIPR is notified of a network address and port number of a next AIPR along a session path, the AIPR forwards subsequent packets to the next AIPR, rather than naturally routing the subsequent packets.

AIPR 3 418 forwards the return packet to AIPR 2 414, whose network address and port number were stored in the database of AIPR 3 418 and identified as the previous waypoint of the session. Likewise, each of the waypoints along the path back to the source client 426 forwards the return packet to its respective previous waypoint.

When the first waypoint, i.e., AIPR 1 408, receives the return packet, the waypoint may restore the return packet to its original form, i.e., the form the return packet had when the destination service 428 sent the return packet, or as the packet might have been modified by the router 430, such as a result of network address translation (NAT) performed by the router 430. Recall that the first waypoint set a flag in its database to indicate the lead packet had not traversed any other waypoint before reaching the first waypoint. This flag is used to signal the first waypoint to restore the return packet and forward the restored return packet to the source client 426. The first waypoint forwards the return packet to the source client 426. Subsequent return packets are similarly handled.

In the third scenario, not shown in FIG. 4, the last AIPR to receive the lead packet has a network address equal to the network address of the destination service. For example, the destination service network address may be given to a gateway router/AIPR, and the gateway router/AIPR may either process the service request or its router table may cause the packet to be forwarded to another node to perform the service. The last AIPR may restore the lead packet and subsequent packets, as described above.

Lead Packet Identification

As noted, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, A TCP session may be ended by including a FIN flag in a packet and having the other node send an ACK, or by simply including an RST flag in a packet. Because each waypoint stores information about each session, such as the source client/destination service network address/port number pairs, the waypoint can identify the session with which each received packet is associated. The waypoint can follow the protocol state of each session by monitoring the messages and flags, such as SYN and FIN, sent by the endpoints of the session and storing state information about each session in its database. Such stateful monitoring of packet traffic is not taught by the prior art known to the inventor. Instead, the prior art teaches away from this type of session.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

Table 2 describes exemplary techniques for identifying the beginning and end of a session, according to various protocols. Similar techniques may be developed for other protocols, based on the definitions of the protocols.

TABLE 2

| Protocol | Destination Port | Technique for Start/End Determination |
|---|---|---|
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 5:
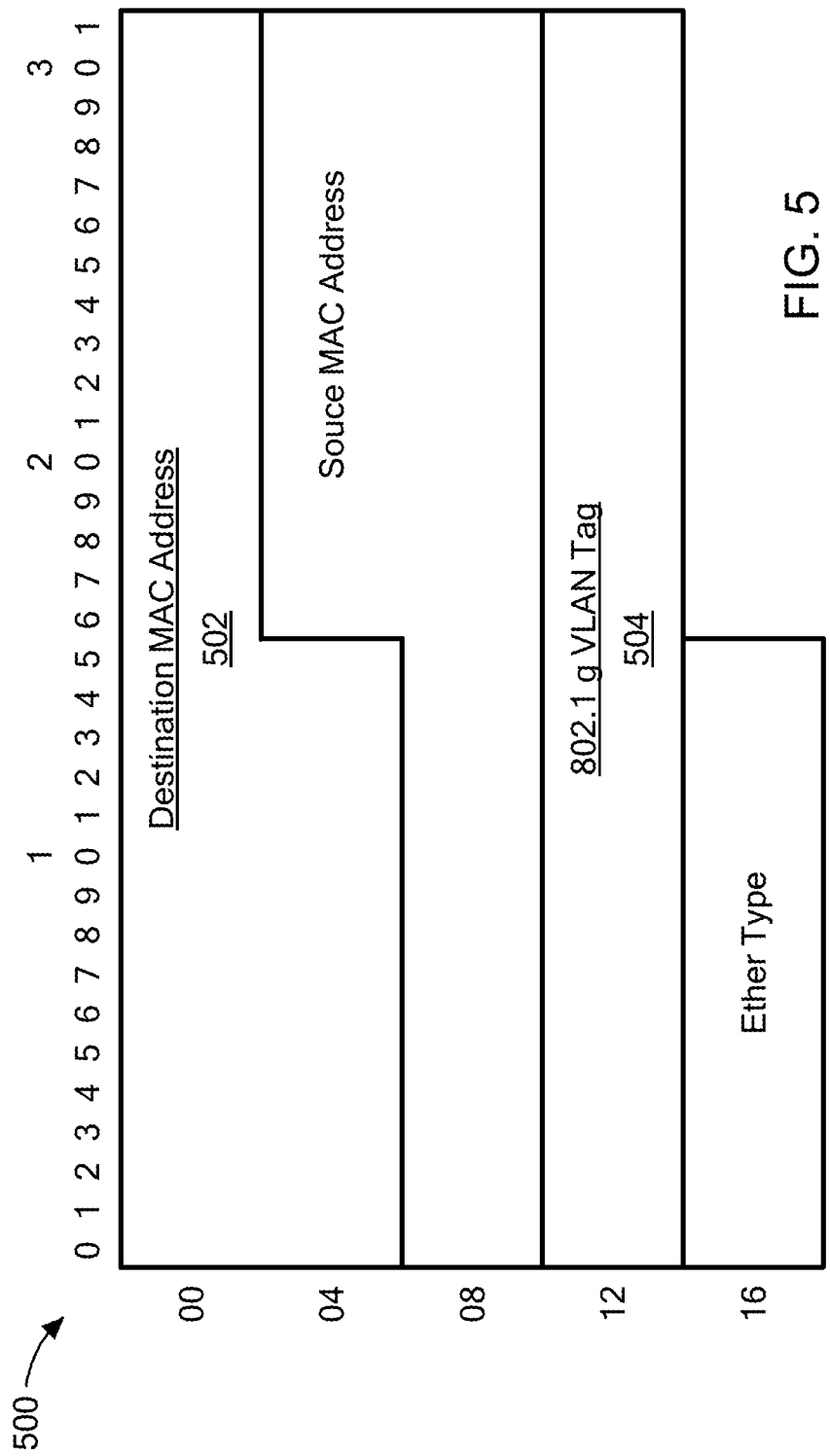
FIG. 5 schematically shows a layout of an Ethernet header, identifying fields used for identifying a beginning of a session, according to an embodiment of the present invention.
Figure 6:
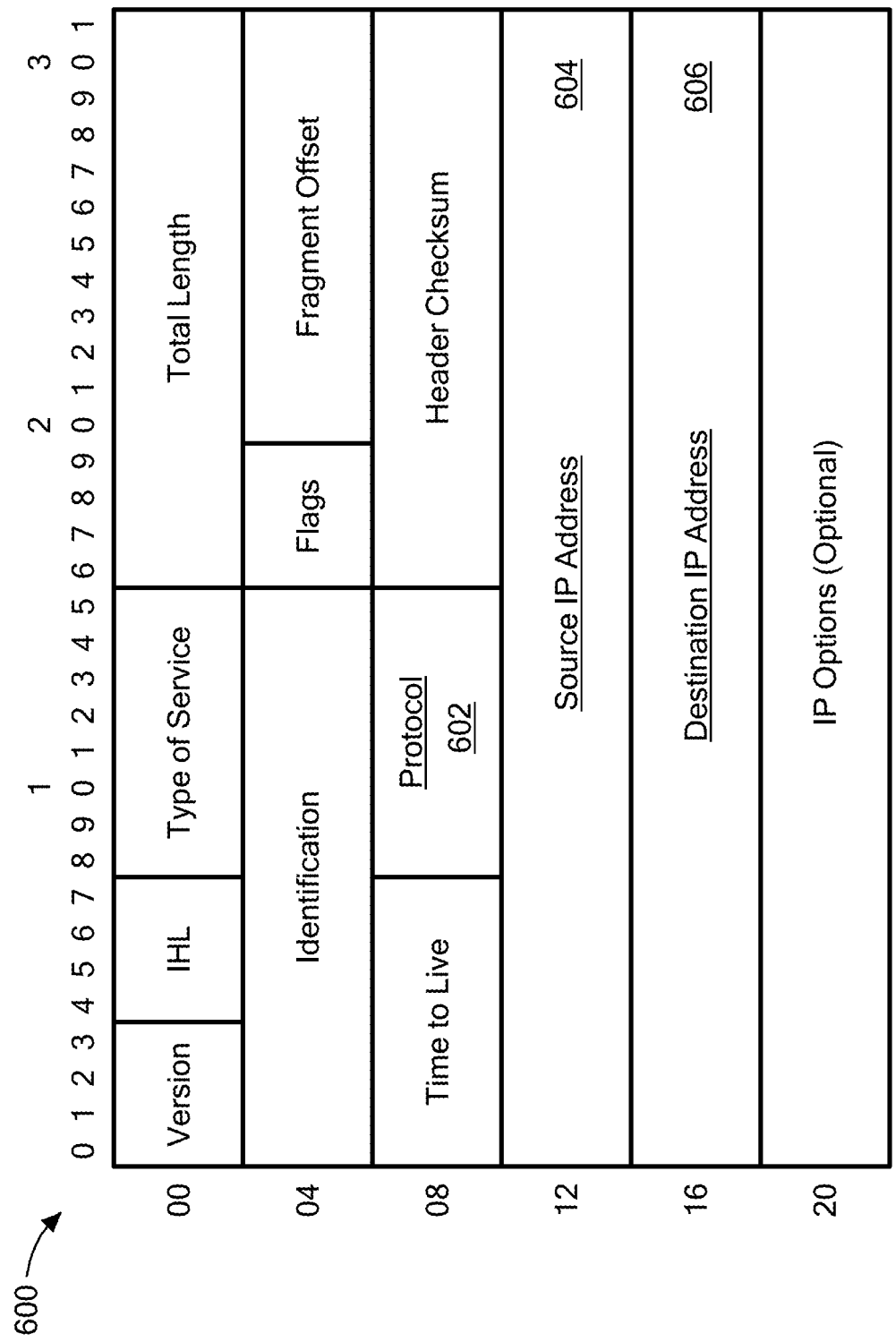
FIG. 6 schematically shows a layout of an IP header, identifying fields used for identifying a beginning of a session, according to an embodiment of the present invention.
Figure 7:
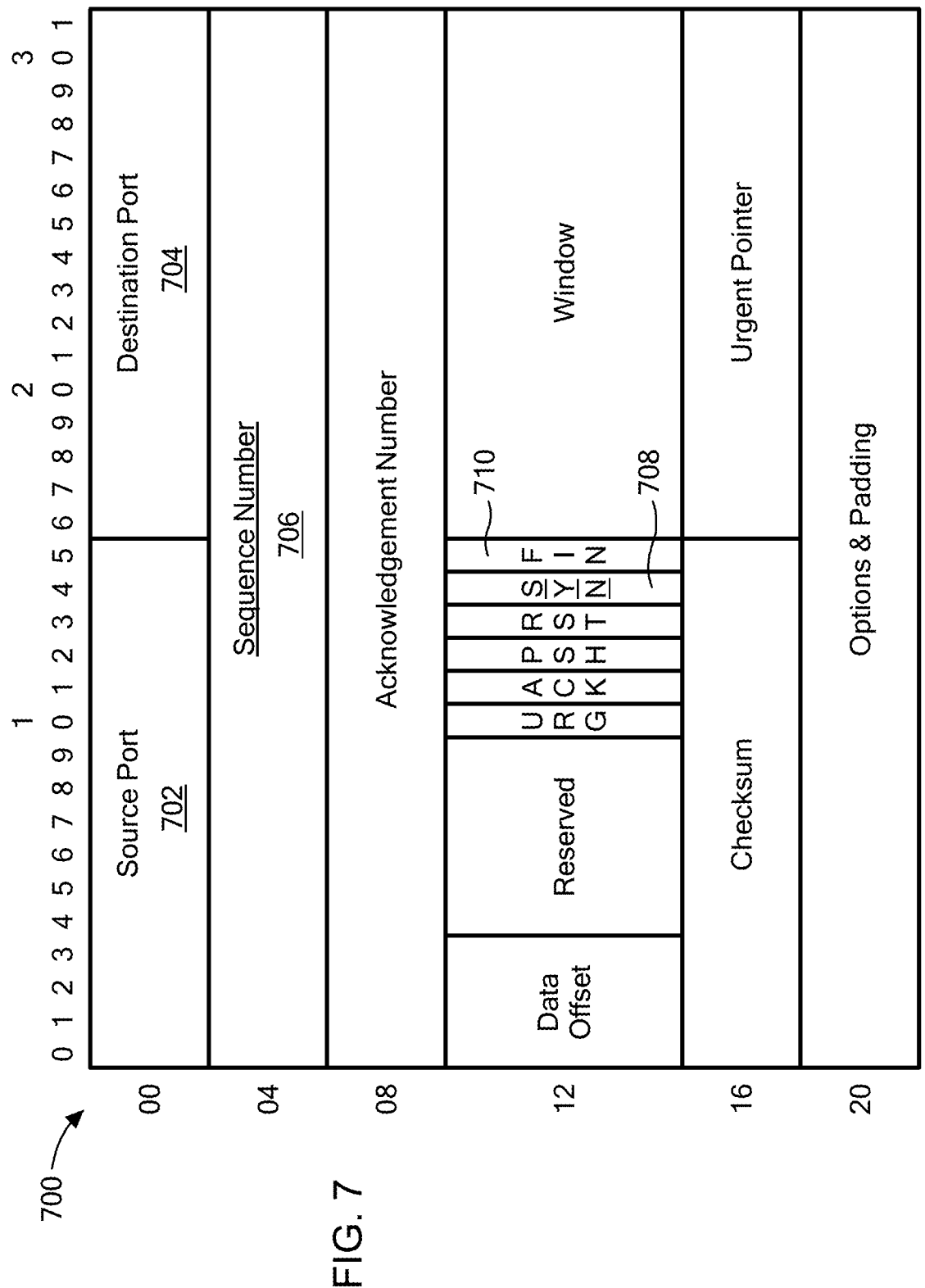
FIG. 7 schematically shows a layout of a TCP header, identifying fields used for identifying a beginning of a session, according to an embodiment of the present invention.

FIG. 5 is a schematic layout of an Ethernet header 500, including a Destination MAC Address 502 and an 802.1q VLAN Tag 504. FIG. 6 is a schematic layout of an IP header 600, including a Protocol field 602, a Source IP Address 604 and a Destination IP Address 606. FIG. 7 is a schematic layout of a TCP header 700, including a Source Port 702, a Destination Port 704, a Sequence Number 706, a SYN flag 708 and a FIN flag 710. These packets and the identified fields may be used to identify the beginning of a session, as summarized in Table 3.

TABLE 3

| Data Item | Where From | Description |
|---|---|---|
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP Header | Defines the flow instance from the source. This may reflect a client, a firewall in front of the client, or a carrier grade NAT. |
| Destination Port | TCP Header | This defines the desired service requested, such as 80 for HTTP. |
| Sequence Number | TCP Header | This is a random number assigned by the client. It may be updated by a firewall or carrier grade NAT. |

TABLE 3-continued

| Data Item | Where From | Description |
| --- | --- | --- |
| SYN Bit On | TCP Header | When the SYN bit is on, and no others, this is an initial packet of a session. It may be retransmitted if there is no response to the first SYN message. |

Augmented IP Router (AIPR)

Figure 8:
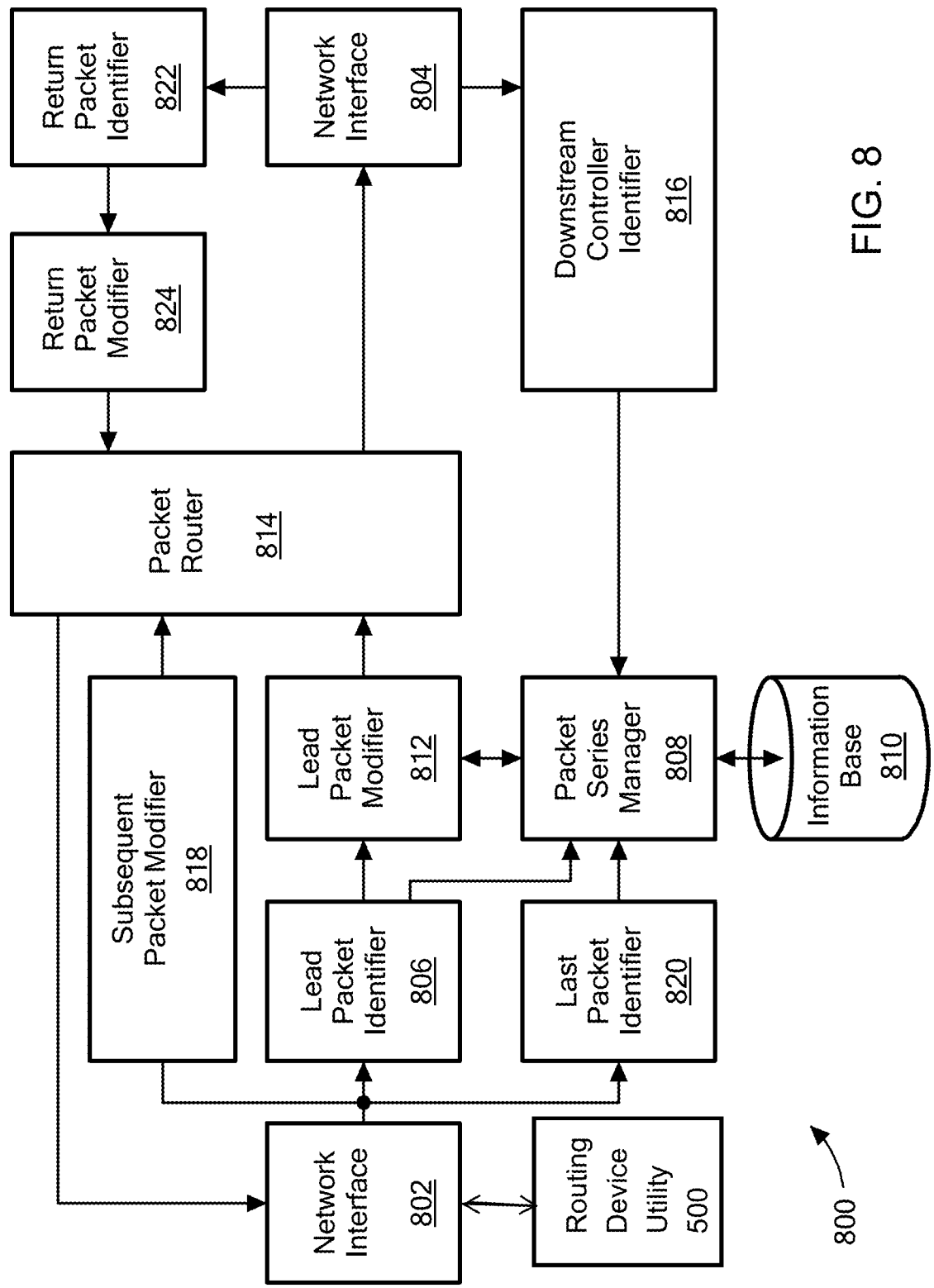
FIG. 8 schematically shows a block diagram of an AIPR of FIG. 4, according to an embodiment of the present invention.

FIG. 8 is a schematic block diagram of an AIPR (waypoint) 800 configured in accordance with illustrative embodiments of the invention. The AIPR 800 includes at least two network interfaces 802 and 804, through which the AIPR 800 may be coupled to two networks. The interfaces 802 and 804 may be, for example, Ethernet interfaces. The AIPR 800 may send and receive packets via the interfaces 802 and 804.

A lead packet identifier 806 automatically identifies lead packets, as discussed herein. In general, the lead packet identifier 806 identifies a lead packet when the lead packet identifier 806 receives a packet related to a session that is not already represented in the AIPR's information base 810, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 808 is coupled to the lead packet identifier 806. For each session, the session manager assigns a unique identifier. The unique identifier may be, for example, a combination of the network address of the AIPR 800 or of the interface 802, in combination with a first port number assigned by the session manager 808 for receiving subsequent packets of this session. The unique identifier may further include the network address of the AIPR 800 or of the other interface 804, in combination with a second port number assigned by the session manager 808 for transmitting the lead packet and subsequent packets. This unique identifier is associated with the session. The session manager 808 stores information about the session in an information base 810. This information may include the unique identifier, in association with the original source client/destination service network address/port number pairs.

Figure 9:
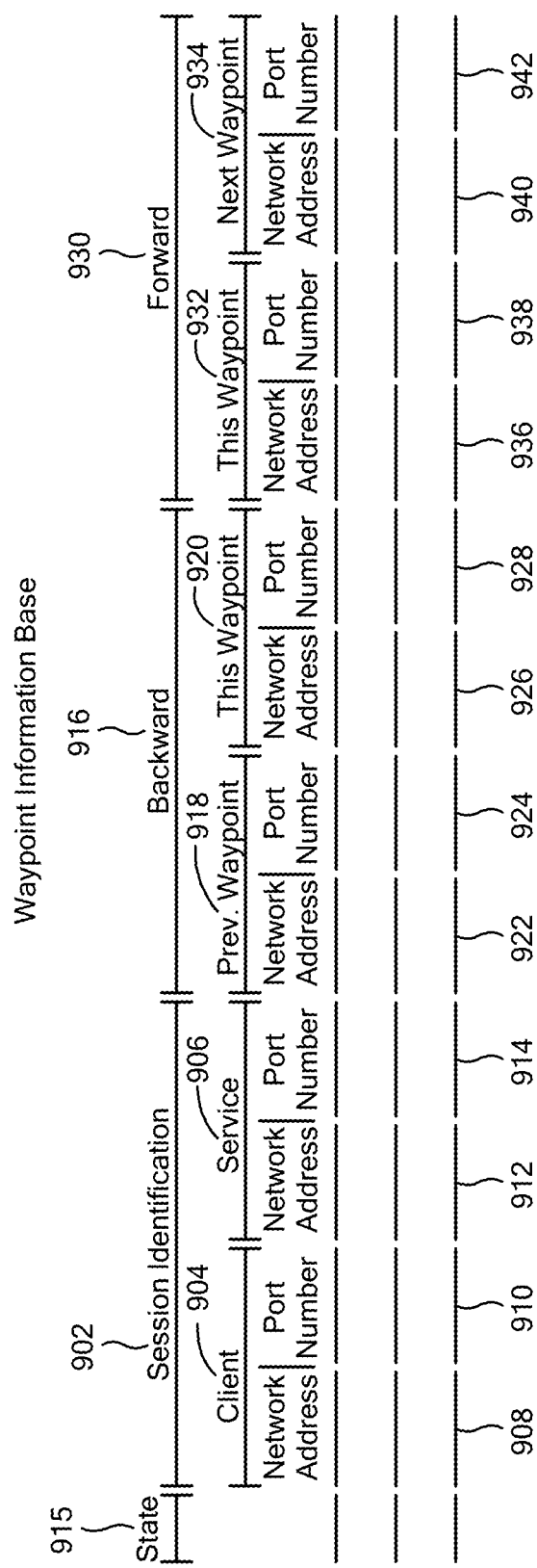
FIG. 9 shows a schematic illustration of information stored in an information base by the AIPR of FIG. 8, according to an embodiment of the present invention.

FIG. 9 is a schematic layout of an exemplary waypoint information base 900. Each row represents a session. A session identification column 902 includes sub-columns for the source client 904 and the destination service 906. For each client 904, its network address 908 and port number 910 are stored. For each destination service 906, its network address 912 and port number 914 are stored. This information is extracted from the lead packet.

State information about the session may be stored in a state column 915. This information may be used to statefully follow a series of packets, such as when a session is being initiated or ended.

A backward column includes sub-columns for storing information 916 about a portion of the backward path, specifically to the previous AIPR. The backward path information 916 includes information 918 about the previous AIPR and information 920 about the present AIPR 800. The information 918 about the previous AIPR includes the AIPR's network address 922 and port number 924. The session manager 808 extracts this information from the lead packet, assuming the lead packet was forwarded by an AIPR. If, however, the present AIPR 800 is the first AIPR to process the lead packet, the information 918 is left blank as a flag. The information 920 about the present AIPR 800 includes the network address 926 of the interface 802 over which the lead packet was received, as well as the first port number 928 assigned by session manager 808.

The waypoint information base 900 is also configured to store information 930 about a portion of the forward path, specifically to the next AIPR. This information 930 includes information 932 about the present AIPR 800 and information 934 about the next AIPR along the path, assuming there is a next AIPR. The information 932 includes the network address 936 of the interface over which the present AIPR will send the lead packet and subsequent packets, as well as the second port number 938 assigned by the session manager 808. The information 934 about the next AIPR along the path may not yet be available, unless the AIPR is provisioned with information about the forward path. The information 934 about the next AIPR includes its network address 940 and port number 942. If the information 934 about the next AIPR is not yet available, the information 934 may be filled in when the AIPR 800 processes a return packet, as described below.

Some embodiments of the waypoint information base 900 may include the forward information 930 without the backward information 916. Other embodiments of the waypoint information base 900 may include the backward information 916 without the forward information 930. Statistical information may be gathered and/or calculated using either or both forward and backward information 916.

Returning to FIG. 8, a lead packet modifier 812 is coupled to the session manager 808. The lead packet modifier 812 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 10:
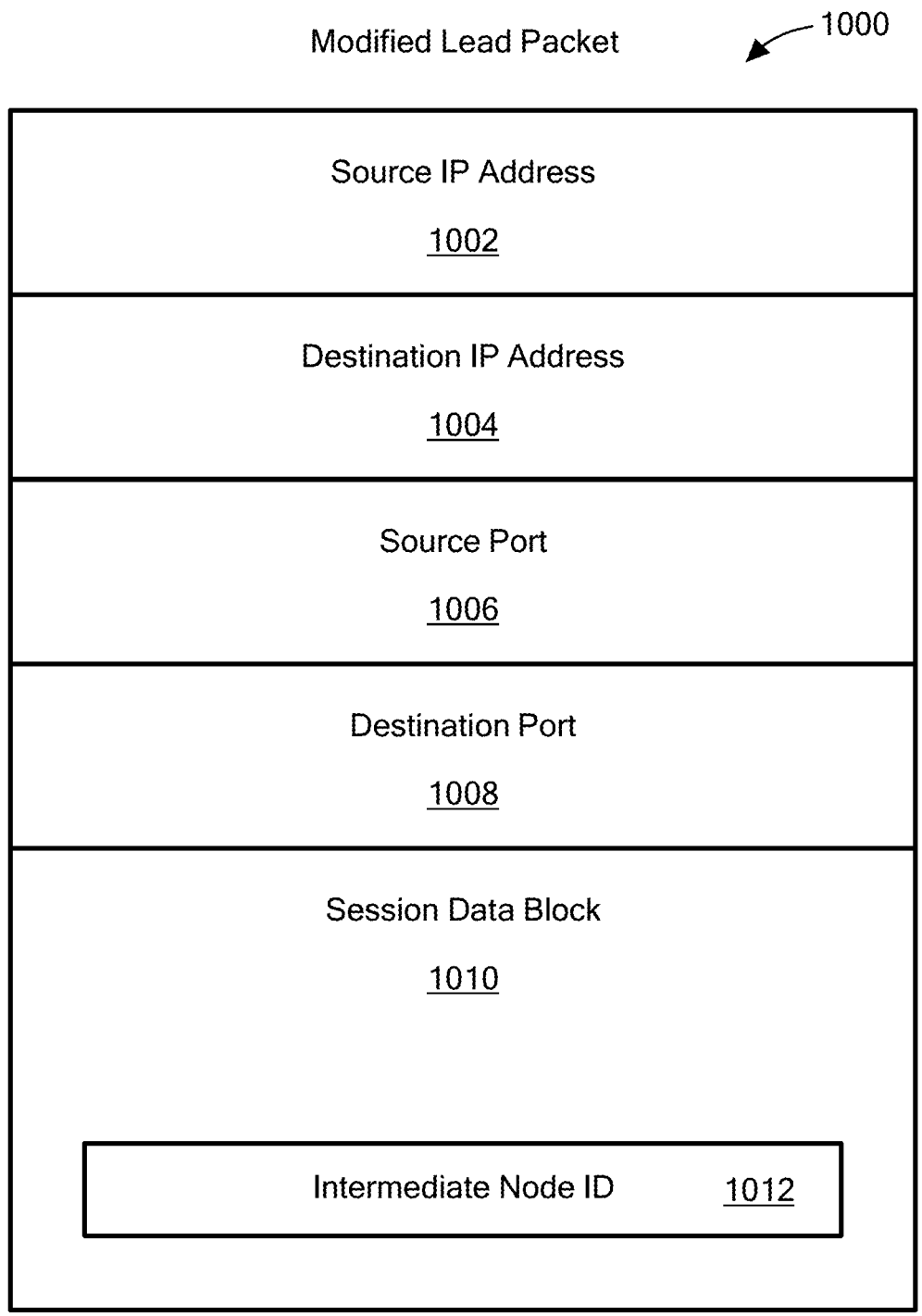
FIG. 10 schematically shows a modified lead packet produced by the AIPR of FIG. 8, according to an embodiment of the present invention.

FIG. 10 is a schematic diagram of an exemplary modified lead packet 1000 showing the original source and destination IP addresses 1002 and 1004, respectively, and the original source and destination port numbers 1006 and 1008, respectively. FIG. 10 also shows a session data block 1010 in the modified lead packet 1000. Although the session data block 1010 is shown as being contiguous, it may instead have its contents distributed throughout the modified lead packet 1000. The session data block 1010 may store an identification of the sending AIPR, i.e., an intermediate node identifier 1012, such as the network address of the second network interface 804 and the second port number.

Returning to FIG. 8, the lead packet modifier 812 updates the packet length, if necessary, to reflect any enlargement of the packet. The lead packet modifier 812 updates the checksum of the packet to reflect the modifications made to the packet. The modified lead packet is then transmitted by a packet router 814, via the second network interface 804. The modified lead packet is naturally routed, unless the AIPR 800 has been provisioned with forward path information.

Eventually, the destination service sends a return packet. The AIPR 800 receives the return packet via the second interface 804. If another AIPR (downstream AIPR) between the present AIPR 800 and the destination service handles the lead packet and the return packet, the downstream AIPR modifies the return packet to include the downstream AIPR's network address and a port number. A downstream controller 816 identifier uses stateful inspection, as described herein, to identify the return packet. The downstream controller 816 stores information 934 (FIG. 9), specifically the network address and port number, about the next AIPR in the waypoint information base 900.

The present AIPR 800 may use this information to address subsequent packets to the next AIPR. Specifically, a subsequent packet modifier 818 may set the destination address of the subsequent packets to the network address and port number 940 and 942 (FIG. 9) of the next waypoint, instead of directly to the destination service. The packet router 814 sends the subsequent packets, according to their modified destination addresses. Thus, for each series of packets, subsequent packets flow through the same downstream packet flow controllers as the lead packet of the series of packets.

A last packet identifier 820 statefully follows each session to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 808 disassociates the unique identifier from the session and deletes information about the session from the waypoint information base 900.

Where the AIPR 800 is provisioned to be a last AIPR before a destination service, the lead packet modifier 806 restores the lead packet to the state the lead packet was in when the source client sent the lead packet, or as the lead packet was modified, such as a result of network address translation (NAT). Similarly, the subsequent packet modifier 818 restores subsequent packets.

Similarly, if the destination address of the lead packet is the same as the network address of the AIPR 800, or its network interface 802 over which it receives the lead packets, the lead packet modifier 806 and the subsequent packet modifier 818 restore the packet and subsequent packets.

As noted, in some protocols, several packets are required to initiate a session, as with the SYN-SYN/ACK-ACK handshake of the TCP. Thus, the downstream controller identifier 816 may wait until a second return packet is received from the destination service before considering a session as having started.

As also noted, some embodiments of the waypoint 800 also manage return packet paths. The lead packet identifier 806 automatically ascertains whether a lead packet was forwarded to the waypoint 800 by an upstream waypoint. If the lead packet includes a session data block, an upstream waypoint forwarded the lead packet. The packet series manager 808 stores information about the upstream waypoint in the waypoint information base 810. A return packet identifier 822 receives return packets from the second network interface 804 and automatically identifies return packets of the session. These return packets may be identified by destination address and port number being equal to the information 932 (FIG. 9) in the waypoint information base corresponding to the session. A return packet modifier modifies the return packets to address them to the upstream waypoint for the session, as identified by the information 918 in the waypoint information base 900.

Figure 11:
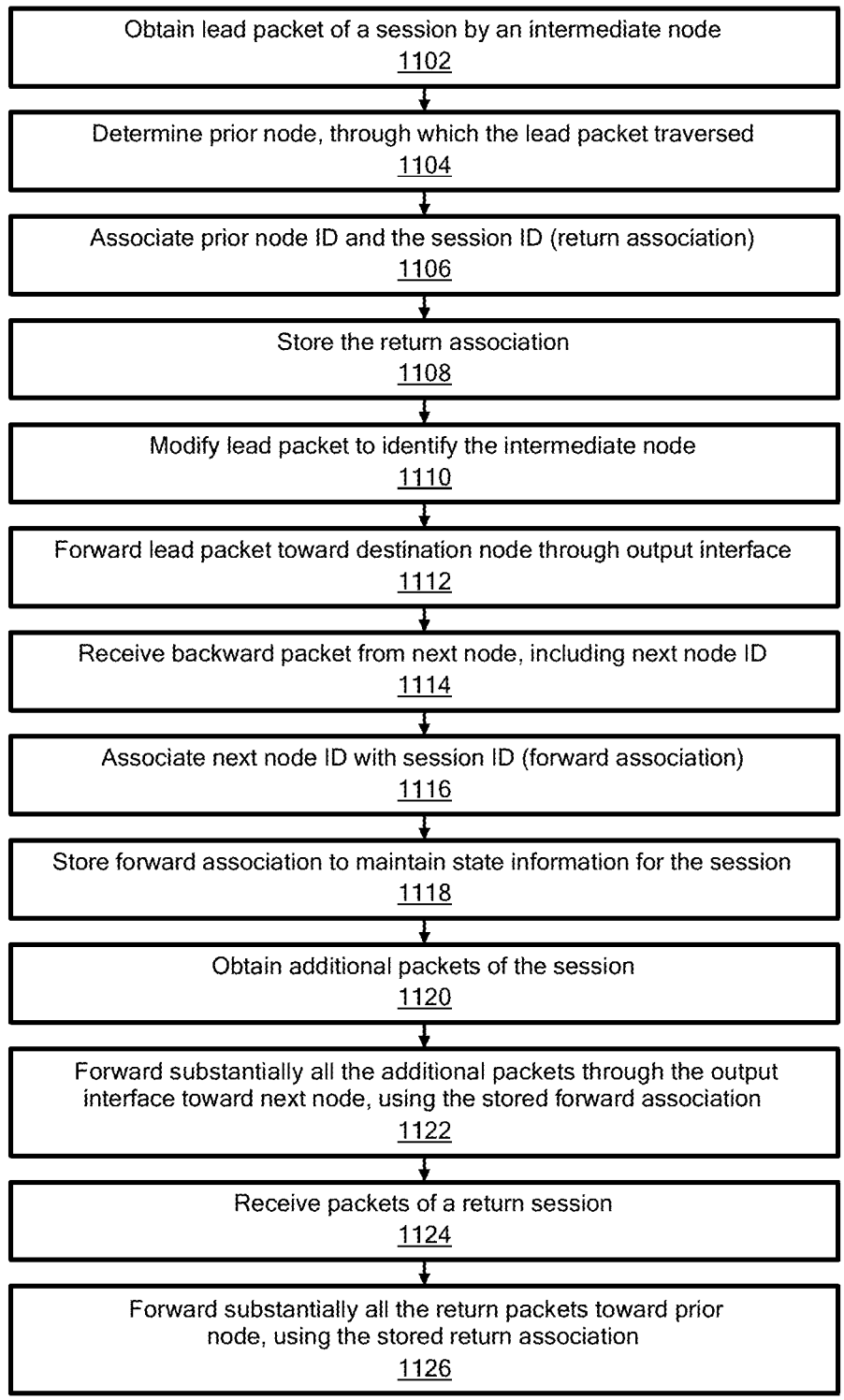
FIGS. 11 and 12 show flowcharts illustrating operations performed by the AIPR of FIGS. 4 and 8, according to an embodiment of the present invention.

FIG. 11 shows a flowchart schematically illustrating some operations performed by the AIPR 800 (FIG. 8) in accordance with illustrative embodiments of the invention. The flowchart illustrates a packet routing method for directing packets of a session from an originating node toward a destination node in an IP network. At step 1102, an intermediate node obtains a lead packet of a plurality of packets in a session. The intermediate node may include a routing device or a switching device that performs a routing function.

The packets in the session have a unique session identifier. At step 1104, a prior node, through which the lead packet traversed, is determined. The prior node has a prior node identifier. At step 1106, a return association is formed between the prior node identifier and the session identifier. At step 1108, the return association is stored in memory to maintain state information for the session.

At step 1110, the lead packet is modified to identify at least the intermediate node. At step 1112, the lead packet is forwarded toward the destination node though an intermediate node electronic output interface to the IP network. The electronic output interface is in communication with the IP network. At step 1114, a backward message (e.g., a packet, referred to as a "backward packet") is received through an electronic input interface of the intermediate node. The backward message is received from a next node. The next node has a next node identifier. The backward message includes the next node identifier and the session identifier. The electronic input interface is in communication with the IP network.

At step 1116, a forward association is formed between the next node identifier and the session identifier. At step 1118, the forward association is stored in memory, to maintain state information for the session. At step 1120, additional packets of the session are obtained. At step 1122, substantially all of the additional packets in the session are forwarded toward the next node, using the stored forward association. The additional packets are forwarded through the electronic output interface of the intermediate node.

At step 1124, a plurality of packets is received in a return session, or a return portion of the session, from the destination. The return session is addressed toward the originating node. At step 1126, substantially all the packets in the return session are forwarded toward the prior node, using the stored return association. The packets are forwarded through the electronic output interface.

Figure 12:
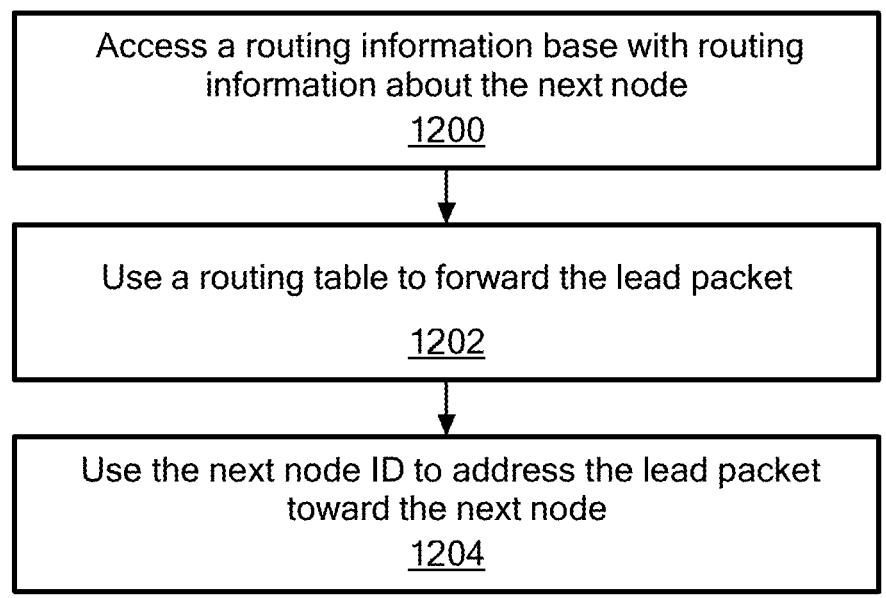

As shown at step 1200 in FIG. 12, forwarding the lead packet 1412 toward the destination node may include accessing a routing information base having routing information for the next node. As shown at step 1202, the intermediate node may have a routing table, and forwarding the lead packet toward the destination node may include using the routing table to forward the lead packet toward the destination node. As shown at step 1204, forwarding the lead packet 1212 toward the destination node may include using the next node identifier to address the lead packet toward the next node.

The lead packet may be addressed so that a plurality of network devices receive the lead packet after it is forwarded and before the next node receives the lead packet.

An AIPR 800 and all or a portion of its components 802-824 may be implemented by a processor executing instructions stored in a memory, hardware (such as combinatorial logic, Application Specific Integrated Circuits (ASICs), Field-Programmable Gate Arrays (FPGAs) or other hardware), firmware, other software, or combinations thereof.

Stateful Flow Management

The inventors discovered unexpected problems when executing a stateful session as described above. Specifically, failure of a node or set of nodes along the path between the source client 426 and the destination service 428 undesirably can undo many of the benefits of this routing scheme. For example, the simplified path shown in FIG. 4 includes routers and the AIPRs 408, 414, 418, and 422 between the source client 426 and the destination service 428. Various routers between the AIPRs 408, 414, 418, and 422 may be used and, in some embodiments, may change. Regardless of the routers that are not AIPRs, the AIPRs 408, 414, 418, and 422 preferably remain in the path to forward packets between the source client 426 and the destination service 428. In illustrative embodiments, this path is a bidirectional path, although some embodiments may implement it as a unidirectional path only.

Problems may arise in response to the failure of a link and/or a network node between two of the networks. Among other things, the link between networks 400 and 402 may fail. In that case, the router 410 may redirect the session flows/packets between the source client 426 and the destination service 428 to a different network. For example, the router 410 may redirect the packets of a given stateful session to an AIPR of a different network not shown in FIG. 4. The same problem may arise with other types of routing changes between the nodes in the stateful path. The inventors recognized this problem and developed a solution to mitigate the adverse effect of such routing changes.

Figure 13:
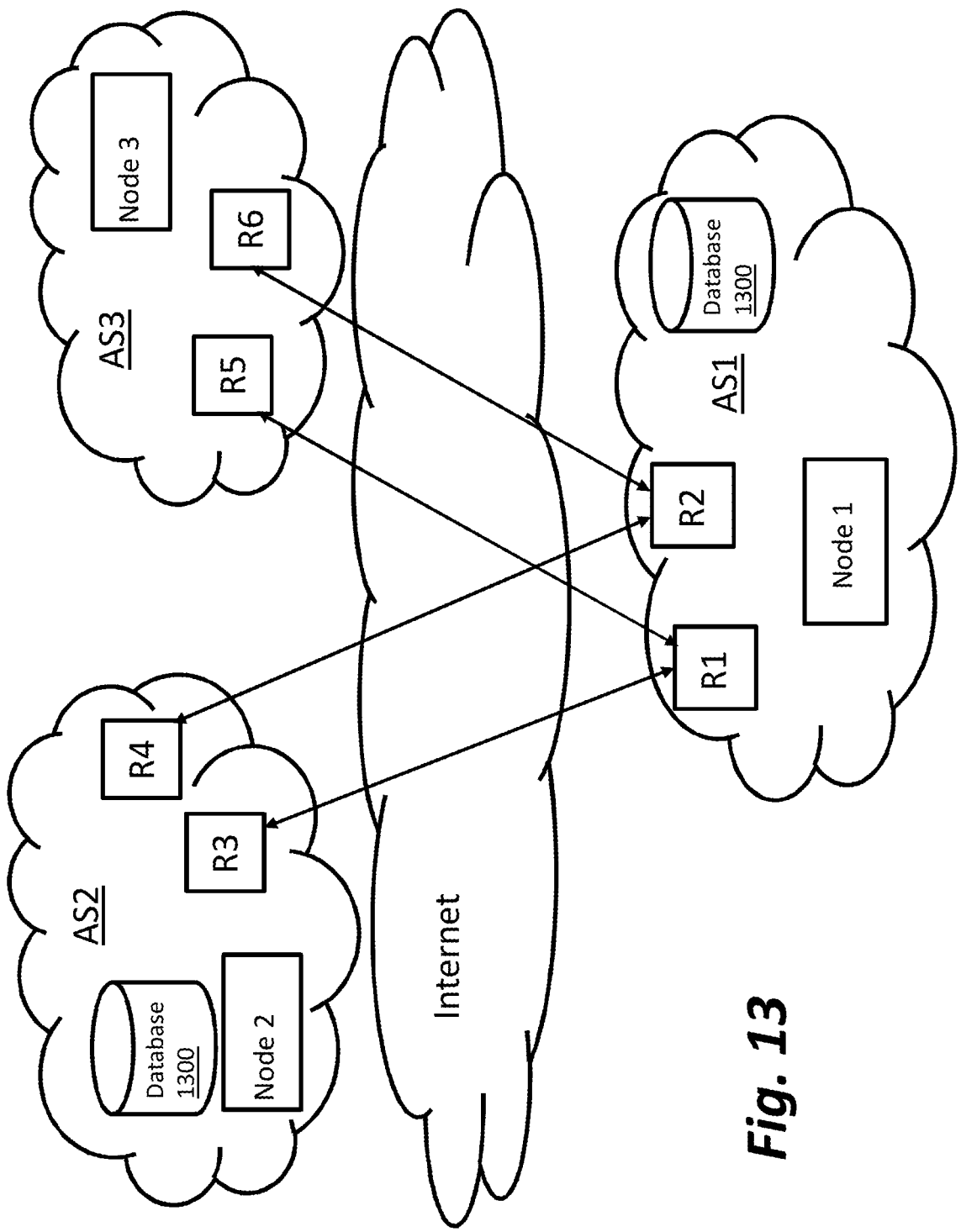
FIG. 13 schematically shows a network having multiple autonomous systems with corresponding edge routers communicating using a method in accordance with illustrative embodiments of the invention.

To illustrate the solution, FIG. 13 shows a network of smaller networks that also may implement the unidirectional or bidirectional stateful sessions implemented in FIG. 4. In this example, three autonomous systems AS1, AS2, and AS3 communicate with each other through the Internet. Indeed, some embodiments may communicate through other networks and thus, discussion of the Internet is for illustrative purposes only.

Each autonomous system AS1, AS2, and AS3 has a plurality of routers and generic nodes. It should be noted that the routers also may be considered nodes but, for simplicity, are identified in FIG. 13 as "R#", where "#" indicates a number. Specifically, the network includes a first autonomous system AS1 that has a node identified as "Node 1," two edge routers R1 and R2, and a session database 1300 that maintains information relating to the stateful sessions used by Node 1 (and/or other nodes) in the autonomous system AS1. In a similar manner, autonomous system AS2 also has a node identified as "Node 2," two edge routers R3 and R4, and a session database 1300 that maintains information relating to the stateful sessions used by the nodes of autonomous system AS2. Autonomous system AS3 also has edge routers R5 and R6, and a node identified as "Node 3." Unlike the other two networks AS1 and AS2, however, the autonomous system AS3 does not have a session database.

Among other things, the autonomous systems AS1, AS2, and AS3 may have more than two edge routers, a plurality of additional nodes (e.g., servers, computers, other routers, etc.), additional non-edge routers, and additional databases. Accordingly, discussion of only two edge routers, one node, and one session database 1300 is for simplicity purposes only.

As shown in FIG. 13, each edge router is configured to communicate with a corresponding edge router of the other two networks. Each of these connections thus may be considered to be routing pairs. For example, router R1 and router R3 communicate as one routing pair, while router R2 and R4 communicate as a second routing pair. These routing pairs enable efficient communication between autonomous systems AS1 and AS2. Each of these edge routers thus may be considered to "face" the other router in its pair.

Illustrative embodiments are discussed as being implemented by edge routers R1-R6. Despite that, alternative embodiments may be implemented by non-edge routers. Specifically, as known by those skilled in the art, an edge router is a specialized router at the edge or boundary of a network, such as on the edge or boundary of each of the autonomous systems AS1, AS2 and AS3. Each edge router ensures the connectivity of its network with external networks, a wide area network, or the Internet. An edge router uses an External Border Gateway Protocol, which is used extensively over the Internet to provide connectivity with remote networks. Instead of providing communication with an internal network, which the core router(s) already manage, an edge router may provide communication with different networks and autonomous systems.

Some or all of the edge routers shown in FIG. 13 may implement the functionality of the AIPR 800 as discussed above. However, some of the edge routers shown in FIG. 13 may not have such functionality. In fact, some of the edge routers in a network of FIG. 13 may not have the capability of correcting routing problems described below with regard to FIG. 15.

Figure 14:
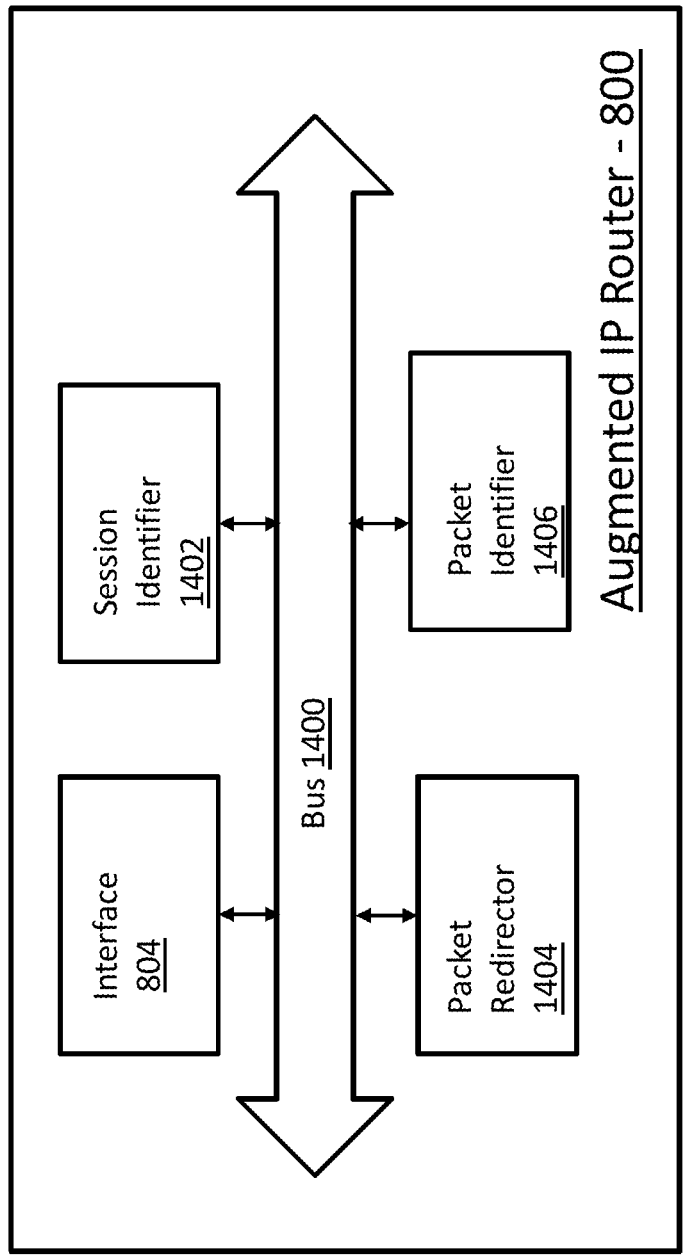
FIG. 14 schematically shows additional details of a router implementing illustrative embodiments of the invention.

FIG. 14 schematically shows an AIPR 800 that manages packets it receives in a unidirectional or bidirectional flow. As discussed above, this AIPR 800 receives one or more mid-stream packets from a stateful session (e.g., using TCP/IP), and determines if it (i.e., the receiving AIPR 800) is part of that session. If the AIPR 800 is not part of the session, then it redirects one or more packets of that session toward a node or multiple nodes in the path of the session from which it originated.

For simplicity, FIG. 14 only shows components of the AIPR 800 for performing the above noted function—i.e., the mid-packet management functionality discussed with regard to FIG. 15 (below). Each of these components of the AIPR 800 is operatively connected by a conventional interconnect mechanism. FIG. 14 simply shows a bus 1400 communicating each the components. Those skilled in the art should understand that this generalized representation can be modified to include other conventional direct or indirect connections. Accordingly, discussion of a bus 1400 is not intended to limit various embodiments.

Indeed, it should be noted that FIG. 14 only schematically shows the AIPR components. Those skilled in the art should understand that each of these components can be implemented in a variety of conventional manners, such as by using hardware, software, or a combination of hardware and software, across one or more other functional components. For example, the AIPR 800 has a session identifier 1402 for identifying sessions of packets it receives. Among other ways, the session identifier 1402 may be implemented using a plurality of microprocessors executing firmware. As another example, the session identifier 1402 may be implemented using one or more application specific integrated circuits (i.e., "ASICs") and related software, or a combination of ASICs, discrete electronic components (e.g., transistors), and microprocessors. Accordingly, the representation of the session identifier 1402 and other components in a single box of FIG. 14 is for simplicity purposes only. In fact, in some embodiments, the session identifier 1402 of FIG. 14 is distributed across a plurality of different machines—not necessarily within the same housing or chassis. In fact, the session identifier 1402 may be implemented as a virtual device.

It should be reiterated that the representation of FIG. 14 is a significantly simplified representation of an actual AIPR 800. Those skilled in the art should understand that such a device has many other physical and functional components, such as those discussed above with regard to earlier figures. For example, the AIPR 800 can have central processing units, session management modules discussed above, other packet processing modules, and short-term memory. Accordingly, this discussion is not intended to suggest that FIG. 14 represents all of the elements of a AIPR 800.

To those ends, the AIPR 800 includes the noted interface 804 for receiving packets from the Internet, other networks (e.g., LANs), and/or other autonomous systems, and a session identifier 1402 configured to cooperate with the session database 1300 to identify the session of a received packet. The AIPR 800 also has a packet redirector 1404 configured to redirect session packets to one or more nodes in the stateful session path of a received packet. In illustrative embodiments, the packet redirector 1404 may be configured to directly forward session packets toward the noted node(s) itself, and/or may be configured to command other upstream nodes to directly forward the packets toward the other node(s) (e.g., instructing another edge router to directly forward the packets).

Illustrative embodiments are expected to redirect packets in response to receipt of a "mid-stream" packet. Specifically, as known by those skilled in the art, a midstream packet is neither the first packet of a stream nor the last packet of the stream. For example, the first packet of a TCP stream may be the SYN packet, while the last packet of that TCP stream may be the FIN packet. Accordingly, the AIPR 800 also includes a packet identifier 1406 configured to identify the type of packet; namely, among other things, whether the package is a mid-stream packet.

Some or all of the functionality of FIG. 14 may be located in the same device, or distributed across multiple different devices. For example, an instance of the packet identifier 1406 may be implemented on a first computing device, while an instance of the packet redirector 1404 may be implemented on a second computing device. This first and second computing devices may be remote from each other, such as on different devices within the same autonomous system, or even on devices communicating through the Internet (e.g., using a cloud computing model). Despite that, cooperation of those functionalities still may be considered part of the AIPR 800. Of course, as noted, all the functionality of FIG. 14 may be located in a single device.

As noted above, the AIPR 800 is configured to respond to upstream routing changes and failures by directing session flows/packets back toward network nodes in the path between two end nodes. To that end, FIG. 15 shows a process of managing such routing changes in accordance with illustrative embodiments of the invention. It should be noted that this process is substantially simplified from a longer process that likely would be used to manage routing changes. Accordingly, the process likely has many steps, such as testing steps, additional routing steps, etc. that those skilled in the art likely would use. In addition, some of the steps may be performed in a different order than that shown, or at the same time. Those skilled in the art therefore can modify the process as appropriate.

Figure 15:
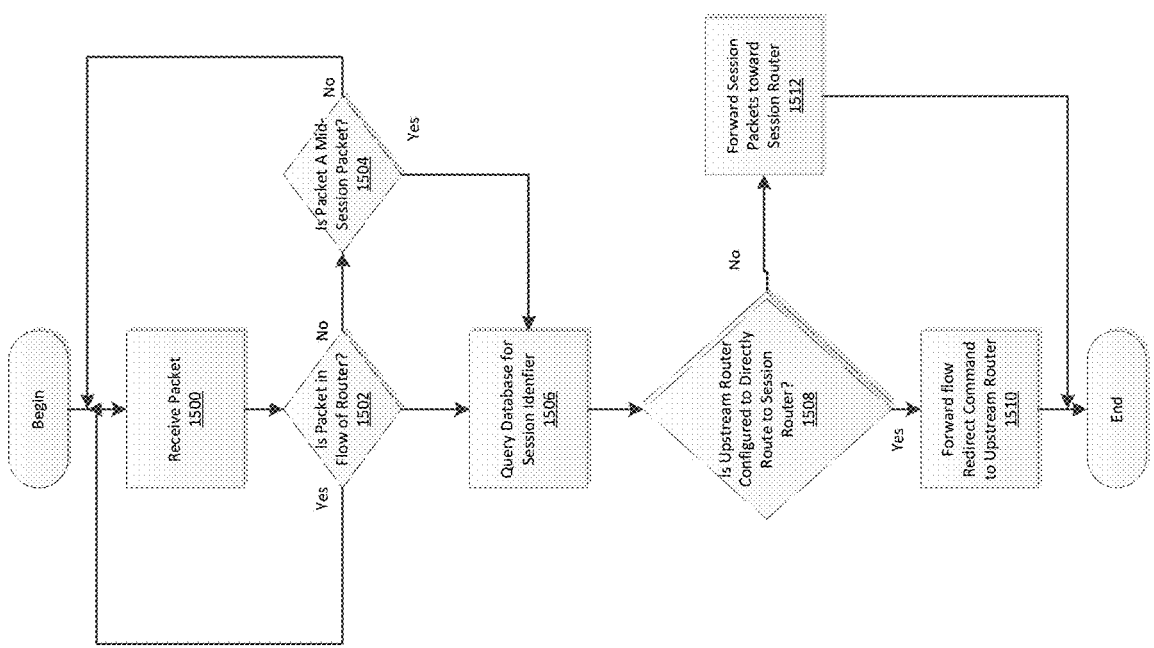
FIG. 15 shows a process of directing mid-stream packets of a bi-directional session toward network devices in that session.

To make the discussion of FIG. 15 more concrete, assume for example that edge router R1 of FIG. 13 receives a stateful session packet from edge router R3. Accordingly, the process of FIG. 15 begins at step 1500, in which the interface 804 of Router R1 (i.e., the AIPR 800) receives the noted session packet ("packet"). Next, the process continues to step 1502, in which the session identifier 1402 or other logic determines if the received packet is from a stateful session in which the AIPR 800 currently participates. In this example, the edge router R1 makes this determination. To that end, the session identifier 1402 may check its local session database 1300 or its local routing database against data in the packet to determine the identity of the session to which it belongs. For example, the session identifier 1402 may review the stored forward association data in the packet. In illustrative embodiments, the session is identified using a 5-tuple of information including a source address, a source port number, a destination address, a destination port number, and a protocol identifier. Alternatively, if the packet is determined to be not part of a stateful session, then the process may end immediately.

If the packet is a part of the stateful session in which the AIPR 800 (i.e., Router R1 of this example) is a path node/edge router, then the process loops back to step 1500 to continue receiving packets. Conversely, if the packet is not part of the stateful session in which the AIPR 800 is a path node, then the process continues to step 1504. For example, the edge router R1 may not be an edge router to receive the packet. In that case, the packet identifier 1406 of the edge router R1 determines if the received packet is a mid-session packet (described above). If the packet is not a mid-session packet, then the process loops back to step 1500 to continue receiving packets.

If, however, the packet is a mid-session packet, then the process continues to step 1506, in which the session identifier 1402 queries the session database 1300 to determine the session to which the packet belongs. After it is identified, the session may be considered to be an "identified session." In this example, the session identifier 1402 of the edge router R1 determines the session to which the packet belongs, and the intended other node in its autonomous system AS1 that should have received the packet. Assume for illustrative purposes that in this example, the edge router R2 is a node in the path of the session to which the packet belongs, and the receive packet should have been directed to that edge router R2. An upstream routing configuration change or failure may have caused the router R3 to direct the packet to the router R1 rather than to the router R2—perhaps due to an upstream change from edge router R4 to edge router R3. In response, the edge router R1 takes action to remedy this problem.

In illustrative embodiments, an autonomous system may have multiple session databases 1300 that are shared among its edge routers. The session databases 1300 preferably are high-speed databases that are programmed to store information for specific stateful sessions passing through its autonomous system. In some embodiments, the session databases 1300 only maintain a sub-set of sessions passing through its autonomous system.

In one embodiment, system administrators and/or logic may make policy decisions as to which stateful sessions they track. For example, the system administrator of autonomous system AS1 may elect to maintain session information in the session database 1300 for video sessions only, highly confidential sessions only, or both. Other embodiments may allocate enough resources to store information about all sessions passing through an autonomous system. In a manner similar to the AIPR 800 functionality of FIG. 14, the session database 1300 may be resident in its local autonomous system, only logically in the autonomous system, or both.

After querying the session database 1300, the process continues to step 1508 to determine if the upstream edge router that forwarded the packet is has the functionality to directly route subsequent session packets to other edge routers in response to a command from the AIPR 800 executing this process. Continuing with the example, the edge router R1 determines if the edge router R3 facing it from autonomous system AS2 has the functionality to respond to a command instructing it to redirect packets of this stateful session to the one or more nodes in its stateful session, such as edge router R2. If the edge router R3 has that functionality, then the process may continue to step 1510 to forward a "flow redirect" command or similar message to the upstream router. In the example discussed above, the edge router R1 may therefore send a redirect command to the edge router R3 in the autonomous system A2. This redirect command has information that, when read by the edge router R3, causes the edge router R3 to redirect subsequent packets in the stateful session to the edge router R2 of the autonomous system AS1. The receive packet also may be forwarded in some manner to the edge router R2, or dropped.

As noted above, in a bi-directional stateful session, the return packets may follow the original path backwards, or become bypassed to some extent through the AIPR 800 receiving the initial packet at step 1500. For example, return packets from edge router R2 may be routed directly to edge router R3. Other embodiments, however, may direct the return packets from the edge router R2 to the edge router R3 through some other route, such as through edge router R4 or edge router R1.

In some embodiments, the upstream router may not have the functionality to directly route to the appropriate node or edge router in the session. For example, the upstream edge router R3 may not be programmed or have logic that enables it to directly reroute packets in the stateful session to the edge router R2. In that case, the process concludes to step 1512, in which the AIPR 800 that receives the packet at step 1500 simply forwards session packets toward the intended session router. In this example, the edge router R1 simply continues to receive packets of the stateful session and directs/forwards them toward the router R2. Return packets from edge router R2 may be returned to the edge router R3 in the manner discussed above.

FIG. 13 also shows that the autonomous system AS3 does not have a session database 1300. In that case, stateful session packets received from that autonomous system AS3 do not implement the functionality discussed with regard to FIG. 15.

Accordingly, illustrative embodiments direct packets of a stateful session toward its original path (i.e., toward a prescribed node, such as an edge router of a path of a stateful session). While the original path may not be completely re-established, such embodiments aim to re-establish much of the originally intended path. In other words, illustrative embodiments aim toward at least re-establishing close to or the same path as the originally intended stateful path, thus enabling the benefits of stateful routing even in the event of a path change between the two communicating nodes.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A router configured to manage packets of a bi-directional session between a first node and a second node in an IP network, comprising:
    an input interface for receiving a mid-stream packet,
    a session identifier operably coupled with the interface, the session identifier being configured to identify the bi-directional session ("identified session") from which the mid-stream packet originated after receiving the mid-stream packet, the identified session comprising a bi-directional path between the first node and the second node, the bi-directional path including a plurality of nodes for bi-directionally forwarding packets between the first node and the second node, the session identifier configured to determine whether the router is associated with the identified session such that the router includes session data that associates the router with a next node in the bi-directional path of the identified session between the first node and the second node;

an output interface configured to forward the mid-stream packet to the next node identified in the session data of the router in response to determining that the router is associated with the identified session; and a packet redirector operably coupled with the session identifier, the session identifier configured to determine at least one node that is associated with the identified session between the first node and the second node and the packet redirector configured to direct routing of one or more packets of the identified session, including the received mid-stream packet, to the at least one node in response to the session identifier determining that the router is not associated with the identified session.

2. The router as defined by claim 1 wherein the received mid-stream packet is received from an upstream node, further wherein the packet redirector is configured to forward a flow modify command to the upstream node, the flow modify command including information that causes the upstream node to forward the one or more packets of the identified session toward the at least one of the plurality of nodes of the identified session.

3. The router as defined by claim 1 wherein the router is configured to act as an edge router.

4. The router as defined by claim 1 further comprising a packet identifier operably coupled with the interface, the packet identifier being configured to determine whether the packet is a mid-stream packet of the bi-directional session.

5. The router as defined by claim 1 wherein the session implements the TCP protocol.

6. The router as defined by claim 1 wherein the identified stream includes a first packet, a plurality of mid-stream packets, and a final packet, the mid-stream packet being one of the plurality of mid-stream packets.

7. The router as defined by claim 1 further comprising a local database with records of a plurality of bi-directional sessions, further wherein the router is part of a local network and includes the local database, the identified session being one of the plurality of bi-directional sessions, wherein the session identifier is configured to access the local database to identify the bi-directional session.

8. A packet routing method for managing packets of a bi-directional session between a first node and a second node in an IP network, the method comprising:

receiving a mid-stream packet at an intermediate node;
identifying, in response to receiving the mid-stream packet, the bi-directional session ("identified session") from which the mid-stream packet originated, the identified session comprising a bi-directional path between the first node and the second node, the bi-directional path including a plurality of nodes for bi-directionally forwarding packets between the first node and the second node;
determining whether the intermediate node that receives the mid-stream packet is associated with the identified session such that the intermediate node includes session data that associates the intermediate node with a next node in the bi-directional path of the identified session between the first node and the second node;
forwarding the mid-stream packet from the intermediate node to the next node identified in the session data of the intermediate node in response to determining that the intermediate node is associated with the identified session; and
determining at least one node that is associated with the identified session between the first node and the second node and directing routing of one or more packets of the identified session, including the received mid-stream packet, to the at least one node in response to determining that the intermediate node is not associated with the identified session.

9. The method as defined by claim 8 wherein the received mid-stream packet is received from an upstream node, further wherein directing comprises forwarding a flow modify command to the upstream node, the flow modify command including information that causes the upstream node to forward the one or more packets of the identified session toward the at least one of the plurality of nodes of the identified session.

10. The method as defined by claim 8 wherein the intermediate node comprises an edge router.

11. The method as defined by claim 8 further comprising determining whether the packet is a mid-stream packet of the bi-directional session before identifying the bi-directional session.

12. The method as defined by claim 8 wherein the session forwards packets using the TCP protocol.

13. The method as defined by claim 8 wherein the identified stream includes a first packet, a plurality of mid-stream packets, and a final packet, the mid-stream packet being one of the plurality of mid-stream packets.

14. The method as defined by claim 8 wherein the intermediate node is part of a local network having a local database with records of a plurality of bi-directional sessions, the identified session being one of the plurality of bi-directional sessions, wherein identifying the bi-directional session comprises accessing the local database to identify the bidirectional session.

15. The method as defined by claim 8 wherein the identified session comprises packets traversing in one direction toward the destination, and in another direction toward the source, further wherein directing that one or more packets of the identified session be routed to at least one of the plurality of nodes of the identified session comprises directing the one or more packets for one direction only.

16. A computer program product for use on a computer system for managing packets of a bi-directional session between a first node and a second node in an IP network, the computer program product comprising a tangible, non-transient computer usable medium having computer readable program code thereon, the computer readable program code comprising:

program code for receiving a mid-stream packet at an intermediate node;
program code for identifying the bi-directional session ("identified session") from which the mid-stream packet originated, the program code for identifying being responsive to the program code for receiving the mid-stream packet, the identified session comprising a bi-directional path between the first node and the second node, the bi-directional path including a plurality of nodes for bi-directionally forwarding packets between the first node and the second node;

program code for determining whether the intermediate node that receives the mid-stream packet is associated with the identified session such that the intermediate node includes session data that associates the intermediate node with a next node in the bi-directional path of the identified session between the first node and the second node;

program code for forwarding the mid-stream packet from the intermediate node to the next node identified in the session data of the intermediate node in response to determining that the intermediate node is associated with the identified session;

program code for determining at least one node that is associated with the identified session between the first node and the second node and directing routing of one or more packets of the identified session, including the received mid-stream packet, to the at least one node in response to determining that the intermediate node is not associated with the identified session.

17. The computer program product as defined by claim 16 wherein the received mid-stream packet is received from an upstream node, further wherein the program code for directing comprises program code for forwarding a flow modify command to the upstream node, the flow modify command including information that causes the upstream node to forward the one or more packets of the identified session toward the at least one of the plurality of nodes of the identified session.

18. The computer program product as defined by claim 16 further comprising program code for determining whether the packet is a mid-stream packet of the bi-directional session before identifying the bi-directional session.

19. The computer program product as defined by claim 16 wherein the identified stream includes a first packet, a plurality of mid-stream packets, and a final packet, the mid-stream packet being one of the plurality of mid-stream packets.

20. The computer program product as defined by claim 16 wherein the identified session comprises packets traversing in one direction toward the destination, and in another direction toward the source, further wherein the program code for directing that one or more packets of the identified session be routed to at least one of the plurality of nodes of the identified session comprises program code for directing the one or more packets for one direction only.

* * * * *